United States Patent
Shastri et al.

(10) Patent No.: US 9,058,308 B2
(45) Date of Patent: Jun. 16, 2015

(54) SYSTEM AND METHOD FOR IDENTIFYING TEXT IN LEGAL DOCUMENTS FOR PREPARATION OF HEADNOTES

(71) Applicant: Infosys Limited, Bangalore (IN)

(72) Inventors: Lokendra Shastri, Kensington, CA (US); Sudesna Maharathy, Orissa (IN); Abhishek Kumar, Ranchi (IN); Gaurav Mishra, Maharashtra (IN); Sankalp Singh Rangi, Haryana (IN); Sivasubramaniam Sivakumar, Tamil Nadu (IN); Suman Kumar Chalavadi, Andhra Pradesh (IN)

(73) Assignee: INFOSYS LIMITED (IN)

( * ) Notice: Subject to any disclaimer, the term of this patent is extended or adjusted under 35 U.S.C. 154(b) by 286 days.

(21) Appl. No.: 13/788,571

(22) Filed: Mar. 7, 2013

(65) Prior Publication Data

US 2013/0238316 A1    Sep. 12, 2013

(30) Foreign Application Priority Data

Mar. 7, 2012  (IN) .............................. 855/CHE/2012

(51) Int. Cl.
*G06F 17/27*  (2006.01)
*G06F 17/28*  (2006.01)
*G06F 17/21*  (2006.01)

(52) U.S. Cl.
CPC ............ *G06F 17/21* (2013.01); *G06F 17/2765* (2013.01)

(58) Field of Classification Search
CPC .......... G06F 17/30011; G06F 17/2235; G06F 17/2247; G06F 17/30241; G06F 17/30648; G06F 17/218; G06F 17/30728; G06F 17/30864; G06Q 10/10; G06Q 50/18; Y10S 707/927

USPC ........ 704/4, 7, 9; 707/711, 769; 715/254, 713
See application file for complete search history.

(56) References Cited

U.S. PATENT DOCUMENTS

| | | | |
|---|---|---|---|
| 6,772,149 B1 * | 8/2004 | Morelock et al. | 1/1 |
| 7,062,498 B2 | 6/2006 | Al-Kofahi et al. | |
| 7,580,939 B2 | 8/2009 | Al-Kofahi et al. | |
| 7,735,010 B2 | 6/2010 | Zhang et al. | |
| 7,778,954 B2 * | 8/2010 | Rhoads et al. | 715/713 |
| 2011/0289105 A1 * | 11/2011 | Hershowitz | 707/769 |

OTHER PUBLICATIONS

M. Saravanan, "Identification of rhetorical roles for segmentation and summarization of a legal judgment", Journal Artificial Intelligence and Law archive vol. 18 Issue 1, Mar. 2010 pp. 45-76.

* cited by examiner

*Primary Examiner* — Charlotte M Baker

(74) *Attorney, Agent, or Firm* — Cantor Colburn LLP

(57) ABSTRACT

A method for generating feature graphs employed for creation of a head note in a legal document is provided. The method enables identifying one or more predetermined features in a plurality of legal documents. The one or more predetermined features are based on grammatical constituents of text in the legal document. The plurality of legal documents is manually identified as headnote and non headnote. The method further enables obtaining data related to the availability of the one or more identified predetermined features in the sentences manually identified as headnote and non headnote in the plurality of legal documents. Furthermore, the method enables computing likelihood of a sentence being a headnote based on the obtained data. The method further enables generating feature graphs corresponding to each predetermined feature based on the computed likelihood and obtained data and storing the generated feature graphs in a repository.

37 Claims, 20 Drawing Sheets

X-axis – number of proper nouns words in a sentence
Y-axis – probability of a sentence being a head note. $\{P(HN_i^f)\}$ X-axis – number of provenance verbs
Y-axis – probability of a sentence being a head note. $\{P(HN_i^f)\}$ X-axis – number of dates in a sentence
Y-axis – probability of a sentence being a head note. $\{P(HN_i^f)\}$ X-axis – depth of a parse tree generated for a sentence
Y-axis – probability of a sentence being a head note. {P(HN$_i^f$)}

X-axis – number of occurrence of explanatory or conditional constructs in a sentence
Y-axis – probability of a sentence being a head note. $\{P(HN_i^f)\}$ X-axis – number of occurrence of subject verb combinations in a sentence
Y-axis – probability of a sentence being a head note. $\{P(HN_i^f)\}$ X-axis – number of occurrence of ellipses in a sentence
Y-axis – probability of a sentence being a head note. {P(HN$_i^f$)}

X-axis – number of occurrence of colons in a sentence
Y-axis – probability of a sentence being a head note. {P(HN$_i^f$)}

X-axis – presence or absence of 'see', 'cite' or 'refer' feature in a sentence
Y-axis – probability of a sentence being a head note. {P(HN$_i^f$)}

X-axis – number of occurrence of in versus in a sentence
Y-axis – probability of a sentence being a head note. $\{P(HN_i^f)\}$ X-axis – number of occurrence of statutes in a sentence
Y-axis – probability of a sentence being a head note. $\{P(HN_i)\}$

SYSTEM AND METHOD FOR IDENTIFYING TEXT IN LEGAL DOCUMENTS FOR PREPARATION OF HEADNOTES

CROSS REFERENCE TO RELATED APPLICATION

This application is related to and claims the benefit under 35 U.S.C. 119(a) to Indian Patent Application No. 855/CHE/2012 filed on Mar. 7, 2012, the contents of which are herein incorporated by reference in their entirety.

FIELD OF THE INVENTION

The present invention relates generally to the field of processing textual documents and more particularly to a system and method for analyzing legal documents, such as court judgment or orders received from judicial authorities, and extracting relevant text from the legal documents to assist a human editor in the preparation of headnotes.

BACKGROUND OF THE INVENTION

A legal document, such as a court judgment or orders received from judicial authorities, is a complex document which contains a large volume of text. A judgment includes text describing a court's judicial opinion for a legal case and also includes citations of other legal cases for establishing precedence for the decision. To aid readers in quickly scanning the judgment and identifying key legal points of the judgment, a headnote is provided preceding the judicial opinion in the legal document. The headnote is a brief summary of the judicial opinion in the legal judgment which aids readers to locate discussion of a legal issue in the judicial opinion. The headnote is typically prepared by a human editor by reading the entire judgment and extracting portions of text manually which are relevant to be added to the headnote.

However, analyzing legal documents and identifying key legal points to prepare headnotes for the legal documents manually is a complex and time consuming task because of the volume of text in such documents. As such, there is a growing need for an automated process for extracting headnotes efficiently and accurately in legal documents. Generally, automated systems exist that are used to extract entities such as 'names of places' and 'names of companies' from text or are used to categorize documents into pre-determined categories. However, the existing systems do not process unstructured information from text which is relevant for inclusion in headnotes. For headnote preparation, these systems do not efficiently and accurately recognize portions of text in the legal document that represent legal reasoning and analysis on a point of law.

In light of the above, there is a need for a method and system that automatically analyzes the huge text in the legal documents and extracts text in the legal document which can be appended in the headnote. Further, there is a need for a method and system that renders the legal document on a display screen of an editor by tagging and highlighting portions of text which has the highest probability to be a headnote. Also, there is a need for a method and system that extracts headnotes from legal documents in a manner which enables the editor to interpret the tagged portions of text as headnotes accurately. In addition, there is a need for a method and system that minimizes the time consumed in extracting headnotes from legal documents.

BRIEF DESCRIPTION OF THE ACCOMPANYING DRAWINGS

The present invention is described by way of embodiments illustrated in the accompanying drawings wherein.

SUMMARY OF THE INVENTION

Figure 1:
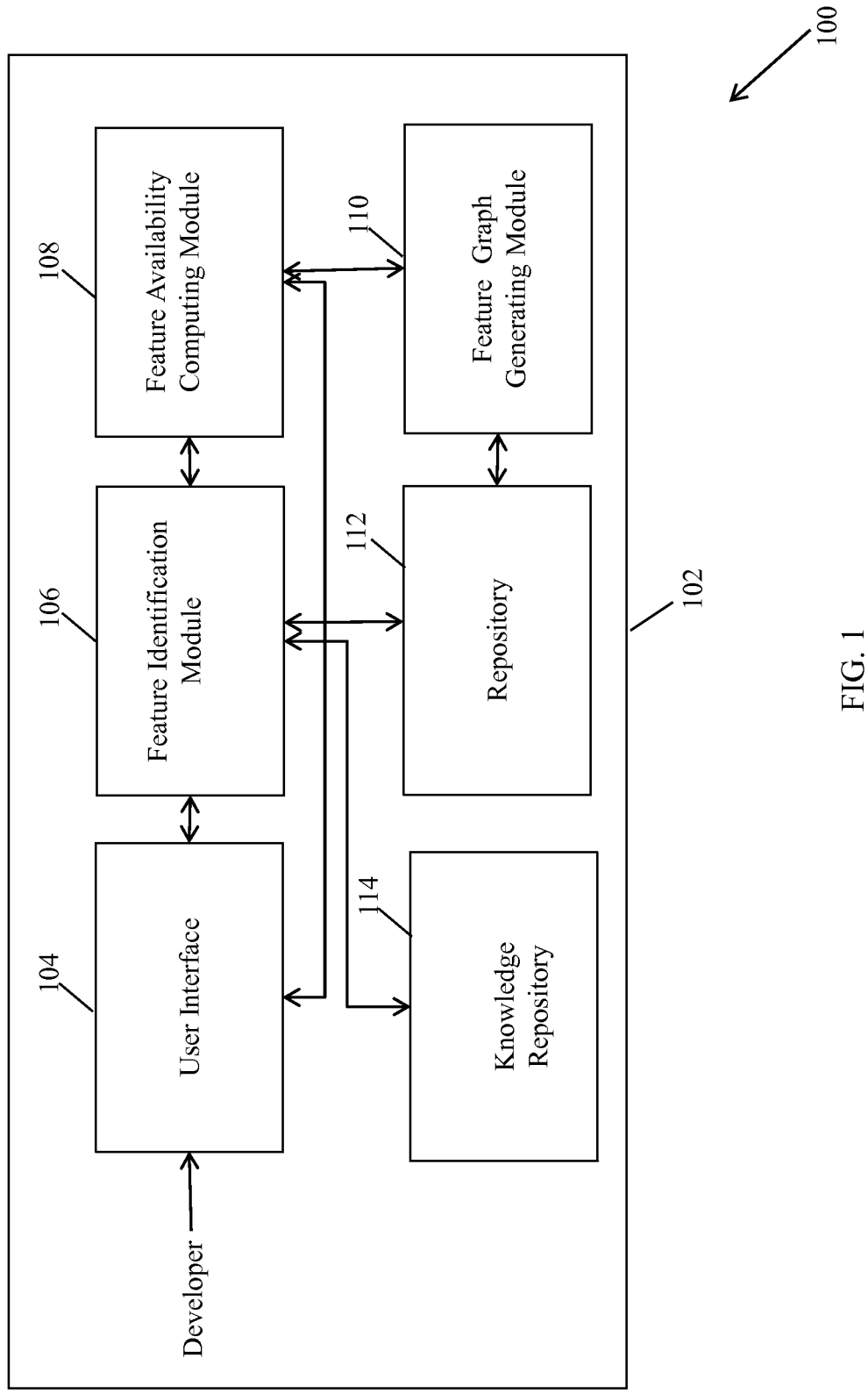
FIG. 1 is a block diagram illustrating a system for generating feature graphs for creation of a headnote in a legal document, in accordance with an embodiment of the present invention.

A method for generating feature graphs employed for creation of a headnote in a legal document is provided. In various embodiments of the present invention, the method comprises identifying one or more predetermined features in a plurality of legal documents. The one or more predetermined features are based on grammatical constituents of text in the legal document. The plurality of legal documents is manually identified as headnote and non headnote. The method further comprises obtaining data related to the availability of the one or more identified predetermined features in the sentences manually identified as headnote and non headnote in the plurality of legal documents. Furthermore, the method comprises computing likelihood of a sentence being a headnote based on the obtained data. The method further comprises generating feature graphs corresponding to each predetermined feature based on the computed likelihood and obtained data and storing the generated feature graphs in a repository.

In an embodiment of the present invention, the one or more predetermined features comprises at least one of: a proper noun feature, a date feature, a provenance feature, a sentence complexity feature, a sentence structure feature, a syntactic structure feature, an abstract-entity extraction feature, a comma feature, an ellipses feature, a colon feature, a see or cite or refer feature, a statute and precedence feature, a sentence position feature and a document structure feature. In another embodiment of the present invention, the method comprises identifying the one or more predetermined features by referring to at least one of lexical, syntactic and semantic information stored in a knowledge repository.

In yet another embodiment of the present invention, the method further comprises determining feature values for each of the identified predetermined features. The feature values represent the number of occurrences of the identified predetermined features. The method further comprises obtaining number of headnote sentences for a specific feature value of each of the identified predetermined features and obtaining number of non headnote sentences for the specific feature value of each of the identified predetermined features.

In another embodiment of present invention, the method comprises calculating probability of a sentence being a headnote using the equation:

$$P(HN_i^f) = \frac{\text{Number of Head note sentences with the value } i \text{ for the feature}}{\text{Number of Head note sentences with the value } i \text{ for the feature } (HN_i^f) + \text{Number of Non head note Sentences } (NHN) \text{ with the value } i \text{ for the feature } (NHN_i^f)}$$

where P(HNif)=probability of a sentence being a head note (HN) for a feature (f) given the feature value (i) of the feature. Feature value (i) represents the number of occurrence of the predetermined feature.

In yet another embodiment of the present invention, the method comprises generating a feature graph where the X-Axis represents the feature values of the predetermined feature and the Y-Axis represents the calculated probability values corresponding to each feature value.

In an embodiment of the present invention, the method comprises computing evidence for a sentence being a headnote or a non-headnote using Demsper-Shafer theory or any other evidence combination techniques. In another embodiment of the present invention, the method computing evidence for a sentence being a headnote or a non-headnote using one or more Fuzzy Logic techniques.

A method for extracting text in a legal document for facilitating preparation of headnotes is provided. In various embodiments of the present invention, the method comprises detecting one or more predetermined features in each sentence of the legal document. The one or more predetermined features are based on grammatical constituents of text in the legal document. The method further comprises computing occurrence of the detected one or more predetermined features in each sentence of the legal document. Furthermore, the method comprises retrieving feature graphs corresponding to the one or more detected predetermined features from a repository. The feature graphs represent likelihood of a sentence being a headnote for a specific number of occurrences of the predetermined features in the sentences. The method comprises analyzing the detected one or more predetermined features based on the computed occurrence of the one or more detected predetermined features and the retrieved feature graphs. The method further comprises rendering the legal document with text tagged as headnote on a user interface based on the analysis.

In an embodiment of the present invention, the method comprises assigning a score to the one or more predetermined feature detected in each sentence by referring to the retrieved feature graphs corresponding to the one or more predetermined feature. The method further comprises combining the assigned score in each sentence to obtain a final headnote score for each sentence. Furthermore, the method comprises comparing the final headnote score with a predetermined threshold. Further, the method comprises tagging text in each sentence as headnote and non headnote based on the comparison.

A method for extracting text in a legal document for preparation of headnotes is provided. In various embodiments of the present invention, the method comprises detecting one or more predetermined features in each sentence of the legal document. The one or more predetermined features are based on grammatical constituents of text in the legal document. The method further comprises computing occurrence of the detected one or more predetermined features in each sentence of the legal document. Furthermore, the method comprises assigning a score to each predetermined feature detected in each sentence by referring to feature graphs corresponding to each predetermined feature. The feature graphs are retrieved from a repository. The method comprises combining the assigned score in each sentence to obtain a final headnote score for each sentence and comparing the final headnote score with a predetermined threshold. Furthermore, the method comprises tagging text in each sentence as headnote and non headnote based on the comparison and rendering the legal document with text tagged as headnote on a user interface.

In an embodiment of the present invention, the method comprises removing unparseable text from the legal document. The method further comprises chunking the received legal document and splitting the legal document into sentences by using the chunks.

In an embodiment of the present invention, the method comprises detecting the one or more predetermined features based on a predetermined pattern stored in a repository. In another embodiment of the present invention, the method comprises detecting the one or more predetermined features using a list of words stored in a repository.

In an embodiment of the present invention, the method further comprises at least one of: computing the number of occurrences of the detected one or more predetermined features in each sentence and computing the presence or absence of the detected one or more predetermined features in each sentence.

In another embodiment of the present invention, the method comprises determining a probability value in the feature graph that corresponds to the computed occurrence of the one or more predetermined features and assigning a score to the one or more predetermined features based on the probability value.

In an embodiment of the present invention, the method comprises combining the assigned scores by multiplying the score assigned to each predetermined feature in each sentence to obtain a final headnote score for each sentence. In yet another embodiment of the present invention, the final headnote score obtained is normalized. In another embodiment of the present invention, the method comprises combining the scores assigned to each predetermined feature in the sentence using evidence combination based integration techniques. In yet another embodiment of the present invention, the method comprises combining the scores assigned to each predetermined feature in the sentence using evidence combination based integration techniques using Fuzzy Logic based integration techniques.

In an embodiment of the present invention, the method further comprises referring to a scatter diagram representing distribution of number of sentences and corresponding final headnote scores. Furthermore, the method comprises selecting a final headnote score that provides a balance between recall and precision and selecting the final headnote score as the predetermined threshold.

In another embodiment of the present invention, the method comprises selecting the final headnote score of each sentence that are equal to or more than the predetermined threshold. In yet another embodiment of the present invention, the method comprises tagging the sentences with the selected final headnote score as headnote and tagging the sentences with final headnote score less than the predetermined threshold as non headnote.

A system for generating feature graphs employed for creation of a headnote in a legal document is provided. In various embodiments of the present invention, the system comprises a feature identification module configured to identify one or more predetermined features in a plurality of legal documents. The one or more predetermined features are based on grammatical constituents of text in the legal document. Further the feature identification module receives the plurality of legal documents manually identified as headnote and non headnote from a user interface. The system further comprises a feature availability computing module configured to obtain data related to the availability of the one or more identified predetermined features in the sentences manually identified as headnote and non headnote in the plurality of legal documents. Furthermore, the feature availability computing module is configured store the obtained data in a repository. Further, the system comprises a feature graph generating module configured to compute likelihood of a sentence being a headnote based on the data stored in the repository. Further, the feature graph generating module is configured to generate feature graphs corresponding to each predetermined feature based on the computed likelihood and stored data and store the generated feature graphs in the repository.

In an embodiment of the present invention, the repository is configured to store a set of predetermined features, a list of words corresponding to the predetermined features and a set of predetermined patterns corresponding to the one or more predetermined features.

In yet another embodiment of the present invention, the feature identification module identifies one or more predetermined features by referring to a knowledge repository that stores at least one of: lexical, syntactic and semantic information.

In another embodiment of the present invention, the feature availability computing module obtains data related to the number of headnote sentences and non headnotes for a specific feature value of each of the predetermined features.

In yet another embodiment of the present invention, the feature graph generating module computes probability value for a specific feature value of each of the predetermined features using the obtained data.

A headnote preparation system for extracting text in a legal document for facilitating preparation of headnotes is provided. In various embodiments of the present invention, the system comprises a repository configured to store feature graphs corresponding to one or more predetermined features. The system further comprises a feature detecting module configured to detect one or more predetermined features in each sentence of the legal document. The one or more predetermined features are based on grammatical constituents of text in the legal document. Furthermore, the system comprises a feature score assigning module configured to compute occurrence of the detected one or more predetermined features in each sentence of the legal document. The feature score assigning module is configured to assign a score to each predetermined feature detected in each sentence by referring to feature graphs corresponding to each predetermined feature stored in the repository based on the computed occurrence of the detected one or more features. The system further comprises a feature integrating module configured to combine the assigned score in each sentence to obtain a final headnote score for each sentence. Furthermore, the system comprises a headnote generating module configured to compare the final headnote score with a predetermined threshold. The headnote generating module is further configured to tag text in each sentence as headnote and non headnote based on the comparison and render the legal document with text tagged as headnote on a user interface. The text tagged as headnote facilitates a user to prepare a headnote for the legal document.

In an embodiment of the present invention, the feature score assigning module is configured to determine a probability value in the features graphs of each of the predetermined features in each sentence based on the estimated occurrence of the predetermined features. The feature score assigning module is further configured to assign a score to the one or more detected predetermined features in each sentence based on the probability value.

A method for extracting text in a legal document for facilitating preparation of headnotes is provided. In various embodiments of the present invention, the method comprises retrieving feature graphs corresponding to one or more of predetermined features. The feature graphs represent probability of a sentence being a headnote for a specific number of occurrences of the predetermined features in the sentence. The method further comprises assigning a score to each predetermined feature in each sentence by referring to the retrieved feature graphs. The method further comprises combining each assigned score in each sentence to obtain a final headnote score for each sentence. Furthermore, the method comprises tagging text in the legal document as headnote and non headnote by comparing the final headnote score in each sentence with a predetermined threshold and rendering text in the legal document that are tagged as headnotes on a user interface.

A headnote preparation system for extracting text in a legal document for facilitating preparation of headnotes is provided. In various embodiments of the present invention, the system comprises a repository for storing feature graphs corresponding to each predetermined feature. The feature graphs represent probability of a sentence being a headnote for a specific number of occurrence of the predetermined features in the sentence. The system further comprises a feature score assigning module configured to assign a score to each predetermined feature in each sentence of the legal document by referring to the feature graphs retrieved from the repository. Furthermore, the system comprises a feature integration module configured to combine each assigned score in each sentence to obtain a final headnote score for each sentence. The method further comprises a headnote generating module configured to tag text in the legal document as headnote and non headnote by comparing the final headnote score in each sentence with a predetermined threshold and a user interface configured to receive the legal document with text tagged as headnotes.

A computer program product comprising a non-transitory computer-readable medium having computer-readable program code stored thereon is provided. The computer-readable program code comprises instructions that when executed by a processor, cause the processor to detect one or more predetermined features in each sentence of the legal document. The one or more predetermined features are based on grammatical constituents of text in the legal document. The computer-readable program code further comprises instructions that when executed by a processor, cause the processor to compute occurrence of the detected one or more predetermined features in each sentence of the legal document. Further, the computer-readable program code comprises instructions that when executed by a processor, cause the processor to retrieve feature graphs corresponding to the one or more detected predetermined features from a repository. The feature graphs represent likelihood of a sentence being a headnote for a specific number of occurrences of the predetermined features in the sentences. Furthermore, the computer-readable program code comprises instructions that when executed by a processor, cause the processor to analyze the detected one or more predetermined features based on the computed occurrence of the one or more detected predetermined features and the retrieved feature graphs. The computer-readable program code further comprises instructions that when executed by a processor, cause the processor to render the legal document with text tagged as headnote on a user interface based on the analysis.

In an embodiment of the present invention, the computer-readable program code comprises instructions that when executed by the processor, cause the processor to assign a score to the one or more predetermined features detected in each sentence by referring to the retrieved feature graphs corresponding to the one or more detected predetermined features. The computer-readable program code further comprises instructions that when executed by the processor, cause the processor to combine the assigned score in each sentence to obtain a final headnote score for each sentence. Further, the computer-readable program code further comprises instructions that when executed by the processor, cause the processor to compare the final headnote score with a predetermined threshold and tag text in each sentence as headnote and non headnote based on the comparison.

DETAILED DESCRIPTION OF THE INVENTION

A system and method for creating headnotes for a legal document is provided. The invention facilitates identifying various features in the legal document and their respective strengths to ascertain that one or more sentences in the legal document are probable headnotes. The invention provides for assisting editors to prepare headnotes. The invention provides for tagging text in the legal document as headnotes and tagging the other text as non-headnotes. The invention facilitates editors to efficiently and accurately prepare headnotes for large legal documents by focusing on the tagged text for headnotes.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

FIG. 1 is a block diagram of a system 102 for generating feature graphs for creation of headnotes in a legal document, in accordance with an embodiment of the present invention.

In various embodiments of the present invention, the generated feature graphs are used in a headnote preparation system for creation of headnotes in the legal document. The headnote preparation system is configured to process a legal document and render on the editor's user interface the legal document with text tagged as headnote. The editor can then focus on the tagged text for preparing headnotes.

In an embodiment of the present invention, for generating feature graphs, text in several legal documents is analyzed manually. Each of the legal documents includes a headnote section preceding judicial opinion provided in the legal document. Referring to the text in the headnote section provided in each of the legal documents, sentences in the judicial opinion portion of the legal document are segregated and manually identified as headnote and non-headnote.

In addition, text in the sentences of each of the legal documents which are identified as headnote and non-headnote is analyzed to manually determine a set of features. The set of features are determined by analyzing grammatical constituents of the text in the sentences. In various exemplary embodiments of the present invention, the predetermined features may include, but are not limited to, a proper noun feature, a date feature, a provenance feature, a sentence complexity feature, a sentence structure feature, a syntactic structure feature, an abstract-entity extraction feature, a comma feature, an ellipses feature, a colon feature, a see or cite or refer feature, a statute and precedence feature, a sentence position feature and a document structure feature. In an embodiment of the present invention, a list of words pertaining to one or more of the predetermined features are also ascertained. In another embodiment of the present invention, a predetermined pattern corresponding to one or more of the predetermined features are ascertained.

In various embodiments of the present invention, the system 102 comprises a user interface 104, a feature identification module 106, a feature availability computing module 108, a feature graph generating module 110, a repository 112 and a knowledge repository 114. In an embodiment of the present invention, the list of predetermined features, the list of words and predetermined pattern corresponding to one or more of the predetermined features are stored in the repository 112.

In an embodiment of the present invention, each of the legal documents with sentences manually identified as either headnote or non-headnote is provided to the system 102 via the user interface 104. The feature identification module 106 is configured to receive the legal documents via the user interface 104. The developer may fetch the list of predetermined features and the list of words and predetermined patterns corresponding to one or more predetermined features from the repository 112. The feature identification module 106 facilitates the developer to identify the predetermined features in each of the sentences of the legal documents by analyzing the text in the sentences. In an embodiment of the present invention, the feature identification module 106 performs the analysis using lexical, syntactic and semantic techniques. In an embodiment of the present invention, the feature identification module 106 performs the analysis by referring to lexical, syntactic, and semantic information stored in the knowledge repository 114. In an embodiment of the present invention, for one or more predetermined features, the feature identification module 106 uses the list of the words stored in the repository 112 and lexical information stored in the knowledge repository 114 to identify the one or more predetermined features. In another embodiment of the present invention, the feature identification module 106 uses the predetermined pattern stored in the repository 112 and lexical, syntactic, and semantic information stored in the knowledge repository 114 to identify the one or more predetermined features.

In an embodiment of the present invention, the feature identification module 106 is configured to identify the predetermined proper noun word feature. The sentences in all the legal documents are scanned and analyzed to identify proper noun word using syntactic information such as Parts of Speech (POS) stored in the knowledge repository 114. The feature identification module 106 uses a conventional natural language parser which tags text in the sentences with Parts of Speech (POS) tags. The POS tags may include, but are not limited to, standard POS tags such as NN representing common noun, NP representing proper noun and VB representing verb. Amongst such POS tags the text tagged as NP are identified. Examples of natural language parser may include, but are not limited to, Stanford Parser®, Open NL Parser® etc. In an embodiment of the present invention, text with proper noun words have a high likelihood of being relevant to be included in a headnote.

In another embodiment of the present invention, the feature identification module 106 is configured to identify the predetermined provenance feature. The sentences in all the legal documents are scanned and analyzed to identify words that are used to describe provenance of a particular statement made in the legal documents. In an embodiment of the present invention, the feature identification module 106 is configured to maintain categories for identifying provenance feature. The categories may include "headnote", "non-headnote" and "neutral". The feature identification module 104 identifies verb words that describe provenance of a particular statement made in the legal documents and assigns the identified verb words to each category. The list of verb words is stored in the repository 112. The feature identification module 106 identifies the verb words using lexical information in the knowledge repository 114. In an exemplary embodiment of the present invention, the verbs assigned to the category "headnotes" include "Says, states, declares".

In another exemplary embodiment of the present invention, the verbs assigned to the "non-headnote category" include "testified, said, and reported". In yet another embodiment of the present invention, the verbs assigned to "neutral" category includes "Stated". In an embodiment of the present invention, verb words categorized as "headnotes" have a high likelihood of being relevant to be included in a head note.

In another embodiment of the present invention, the feature identification module 106 is configured to identify a date feature. Sentences in all the legal documents are scanned and analyzed to extract dates from the sentences. The feature identification module 106 is configured to use the predetermined pattern stored in the repository 112 for recognizing dates in the text. The feature identification module 106 recognizes text in the sentences that match with the predetermined patterns to identify the date feature using lexical information stored in the knowledge repository 114. The date feature indicates that sentences with date patterns provide episodic information related to the present case. In an embodiment of the present invention, text with date feature has a very low likelihood of being included in a head note as head notes do not contain episodic information. Such text may form non-headnote text.

In another embodiment of the present invention, the feature identification module 106 is configured to identify the predetermined sentence complexity feature. Analysis of several legal documents and headnotes provided therein indicate that headnotes have complex sentences. On the basis of the analysis, the sentence complexity feature identifies text in sentences which may be relevant for including in headnotes. Sentences in all the legal documents are scanned and analyzed to identify a complex sentence. In an embodiment of the present invention, the feature identification module 106 uses syntactic information in the knowledge repository 114 to identify complex sentences. The feature identification module 106 is configured to determine the level of complexity of the identified complex sentences by generating a parse tree for each sentence using any known natural language parser such as Standard Parser®, Open NLP Parser® etc. A parse tree graphically represents the arrangement of words in each sentence. Depth of parse tree for each sentence is then measured which in turn indicates complexity of each sentence. In an embodiment of the present invention, the sentences with deep parse trees are considered as sentences of greater complexity for including in headnotes.

In yet another embodiment of the present invention, the feature identification module 106 is configured to identify the predetermined sentence structure feature. On the basis of the analysis of several legal documents and headnotes provided therein, an argumentative or explanatory sentence is generally considered as relevant for including in headnotes. Sentences in all the legal documents is scanned and analyzed to identify the sentence structure feature. The feature identification module 106 is configured to use lexical information stored in the knowledge repository 114 to identify the words which represents explanatory or conditional constructs like "Nonetheless, however, regardless . . . ." In an embodiment of the present invention, the explanatory or conditional constructs in sentences indicate that the sentences are argumentative and explanatory and hence likely to be relevant for including in headnotes.

In another embodiment of the present invention, the feature identification module 106 is configured to identify the predetermined syntactic structure feature. Syntactic structure feature may be identified from sentences in the legal document that includes subject verb combinations in the sentences. On the basis of the analysis of several legal documents and headnotes provided therein, it is determined that sentences with subject verb combinations are sweeping in nature and generally include aspects of law. Sentences in the legal documents are scanned and analyzed to identify the syntactic structure feature. The feature identification module 106 is configured to use the syntactic information stored in the knowledge repository 114 to identify text from the sentences that have multiple subject verb combinations. The feature identification module 106 is configured to use any natural language parser to tag subject verb combinations in the sentences by using Parts of Speech (POS) tags. The feature identification module 106 then searches for combinations of noun tags {i.e. NN, NP, NNP, NNS} with verb tags {i.e. VB,VBG} tags. In an embodiment of the present invention, sentences tagged with subject verb combinations have a high likelihood for inclusion in headnotes.

In yet another embodiment of the present invention, the feature identification module 106 is configured to identify the predetermined abstract-entity feature. The abstract-entity feature indicates the number of abstract entities in the sentences. The abstract entities are words that provide the sentences with a sweeping nature or render the sentences as abstract level statements. For example, words such as "car", "bus", and "truck" are generic words whereas "automobile" is an abstract word. "Rifle", "revolver" etc. are generic words and "firearm" is abstract. On the basis of the analysis of several legal documents and headnotes provided therein, it is determined that sentences with abstract words are sweeping in nature and generally include aspects of law. Sentences in all the legal documents are scanned and analyzed to identify text in the sentences that have a number of abstract words. The feature identification module 106 is configured to use abstract words stored in the repository 112 and lexical information in the knowledge repository 114 to identify abstract words in the sentences. The feature identification module 106 is configured to use any natural language parser which employs Parts of Speech (POS) tags to tag the abstract words in the sentences. The abstract words are generally 'nouns' and the feature identification module 106 is configured to sort the identified abstract words in an order on the basis of the extent the words may be considered to be abstract.

In another embodiment of the present invention, the feature identification module 106 is configured to identify the predetermined ellipse feature. An ellipse refers to a complete statement which is not quoted from beginning of the sentence and only a certain portion of the text is quoted using the construct " . . . ". The ellipse feature facilitates to determine the sweeping nature of the sentence for inclusion in headnotes. A pattern is predetermined for counting number occurrences of " . . . " in each sentence of the legal document and stored in the repository 112. Sentences in the legal documents are scanned and analyzed to identify text with ellipses " . . . " The feature identification module 106 is configured to use syntactic information stored in the knowledge repository 114 to identify text with ellipses " . . . " as per the predetermined pattern stored in the repository 112.

In another embodiment of the present invention, the feature identification module 106 is configured to identify the predetermined colon feature. On the basis of the analysis of several legal documents and headnotes provided therein, it is determined that when a source like a law or statute or prior case is quoted, the usage of ":" as a delimiter between the text in the document and the quoted text is used. Sentences in all the legal documents are scanned and analyzed to identify text with colon ":". The feature identification module 106 is configured to use the syntactic information stored in the knowledge repository 114 to identify text with colon ":" as per the predetermined pattern stored in the repository 112.

In another embodiment of the present invention, the feature identification module 106 is configured to identify the predetermined comma feature. The comma feature facilitates to determine the sweeping nature of the sentence for inclusion in headnotes. A pattern is predetermined for counting number of commas in each sentence of the legal document to extract sentences which includes text prefixed or suffixed with comma. In accordance with the predetermined pattern, a comma is counted if it occurs with phrases or clauses or with verbs in the sentences. The occurrence of multiple commas which occur without nouns as in "Tom, Jerry, Jenny and Marcus went to the market . . . " are not counted. Sentences in the legal document are scanned and analyzed to extract text with commas which is identified as per the predetermined pattern. The feature identification module 106 is configured to use the syntactic information stored in the knowledge repository 114 to identify text with comma as per the predetermined pattern stored in the repository 112.

In an embodiment of the present invention, the feature identification module 106 is configured to identify the predetermined see or cite or refer feature. On the basis of the analysis of several legal documents and headnotes provided therein, it is determined that when a statement is quoted from an external source in the legal document "see", "cite" or "refer" is mentioned. Based on the analysis a pattern is predetermined to recognize text with "see", "cite" or "refer". Sentences in the legal document is scanned and analyzed to extract such text. The feature identification module 106 is configured to use the syntactic information stored in the knowledge repository 114 to identify text with "see", "cite" or "refer" as per the predetermined pattern stored in the repository 112.

In an embodiment of the present invention, the feature identification module 106 is configured to identify the predetermined versus feature. Versus feature refers to case references cited in legal documents. On the basis of the analysis of several legal documents and headnotes provided therein, it is determined that case references, for example, "ABC v XYZ", "*People* v *Bludson,* 97 NY2d 644, 646, 761 NE2d1016, 736 NYS2d 289 [2001]) form an important portion in headnotes.

A pattern is predetermined to count the occurrences of such case references in legal document to extract the versus feature. Sentences in the legal document are scanned and analyzed to extract the versus feature based on the predetermined pattern. The feature identification module 106 is configured to use the syntactic information stored in the knowledge repository 114 to identify text with versus feature as per the predetermined pattern stored in the repository 112.

In another embodiment of the present invention, the feature identification module 106 is configured to identify the predetermined statute and precedence feature. The statute and precedence feature indicates statements which have prior usage in some cases and that is used again in the present legal document. Whenever a statement is taken from a specific law or statute, reference to that law is added to the statement. On the basis of the analysis of several legal documents and headnotes provided therein, a pattern is determined to identify the statute and precedence feature in the legal document. An example of the pattern may include "CPLR §3212[b]" for statute and "71 NY2d 76, 518 N.E.2d 896, 524 N.Y.S.2d1 [1987]" for precedence. Sentences in the legal documents are scanned and analyzed to extract the statute and precedence feature based on the predetermined pattern. The feature identification module 106 is configured to use the syntactic information stored in the knowledge repository 114 to identify text with statute and precedence feature as per the predetermined pattern stored in the repository 112.

In another embodiment of the present invention, the feature identification module 106 is configured to identify the predetermined sentence position feature. The sentence position feature provides information regarding exact position of each sentence in the legal document. On the basis of the analysis of several legal documents and headnotes provided therein, it is determined that position of sentences in the legal document provides information related to the likelihood of a sentence being a headnote. For example, generally sentences appearing in the beginning of the legal document are not included in headnotes and sentences towards the end of the legal document are included in headnotes.

The exact position of sentence in the legal document is obtained by determining sentence numbers in the legal document when the document is processed. The feature identification module 106 is configured to use the syntactic information stored in the knowledge repository 114 to identify text in the sentences based on position of the sentences.

In another embodiment of the present invention, the feature identification module 106 is configured to identify the predetermined document structure feature. On the basis of the analysis of several legal documents and headnotes provided therein, it is determined that the writers of the legal document follow a general structure while publishing the legal document. For example, the legal document is divided into three sections such as "Case Description section", "Analysis section" and "Final Judgment section". The document structure feature is extracted by ascertaining that text relevant to be included in the headnotes is present in the "Analysis section". Each sentence in the legal document is scanned and analyzed to divide the legal document into the above-mentioned three sections. Further, the "Analysis section" is analyzed to extract text from each sentence of the "Analysis section" likely to be relevant for including in headnotes appearing in each of the aforementioned sections is measured. The feature identification module 106 is configured to perform semantic analysis of text to identify the document structure feature. The feature identification module 106 is configured to use the semantic information stored in the knowledge repository 114 to perform semantic analysis and identify text in the sentences corresponding to the document structure feature.

In an embodiment of the present invention, the feature identification module 106 is configured to tag the identified predetermined features in each of the multiple legal documents. As mentioned previously, sentences in the multiple legal documents are manually identified as headnote and non-headnote. In addition, the feature identification module 106 tags the sentences in the multiple documents which are manually identified as headnote and non-headnotes. The feature identification module 106 sends the tagged documents to the feature availability computing module 108.

In an embodiment of the present invention, the feature availability computing module 108 is configured to receive and process the tagged multiple legal documents. In an embodiment of the present invention, the feature availability computing module 108 processes the tagged legal documents to obtain data corresponding to each of the predetermined features. The data corresponds to number of predetermined features, number of headnotes, number of non headnotes etc.

In an exemplary embodiment of the present invention, the data may be obtained and tabulated in a format illustrated in table 1.

TABLE 1

| Number of predetermined feature identified (e.g. proper noun feature.) | 0 | 1 | 2 | 3 |
|---|---|---|---|---|
| Number of head note sentences | 0 | 6 | x | n |
| Number of Non-head note sentences | 4 | 2 | y | m |

As shown in the table, the number of predetermined features represents features values for each of the identified predetermined features. In an embodiment of the present invention, the feature values represent the number of occurrences of the predetermined features in a particular number of sentences tagged as headnote or non-headnote. In another embodiment of the present invention, the feature values represent presence or absence of a predetermined feature in a particular number of sentences tagged as headnote or non-headnote.

For example, the first row and second column in the Table 1 illustrates that the number of occurrence of proper noun feature is one i.e. the feature value is one. The third column and second row in the table illustrates that the number of headnote sentences in all the legal documents where the proper noun feature has occurred once is six. The third column and third row in the table illustrates that the number of non-headnote sentences in all the legal documents where the proper noun feature has occurred once is two.

In various embodiments of the present invention, for a specific feature value corresponding to each predetermined feature, the number of headnote sentences and the number of non headnote sentences are obtained from the multiple legal documents. The obtained data is stored in the repository.

Feature graph generating module 110 is configured to generate a graph for each feature using the obtained data stored in the repository 112. In an embodiment of the present invention, for each predetermined feature, the feature graph generating module 110 is configured to compute the likelihood of a particular sentence being a headnote or a non-headnote using the obtained data.

In an exemplary embodiment of the present invention, the feature graph generating module 110 is configured to compute the likelihood by calculating the probability of a sentence being a headnote using the following equation.

$$P(HN_i^f) = \frac{\text{Number of Head note sentences with the value } i \text{ for the feature}}{\text{Number of Head note sentences with the value } i \text{ for the feature } (HN_i^f) + \text{Number of Non head note Sentences } (NHN) \text{ with the value } i \text{ for the feature } (NHN_i^f)}$$

where P(HNif)=probability of a sentence being a head note (HN) for a feature (f) given the feature value (i) of the feature.

In an exemplary embodiment of the present invention, using the data (as illustrated in table 1), probability of a particular sentence being a headnote is calculated for the proper noun feature if the number of occurrences of proper noun in the sentence is 0, 1, 2 and 3 i.e. for feature values 0, 1, 2 and 3.

In an embodiment of the present invention, the feature graph generating module 110 generates a feature graph corresponding to each predetermined feature using the obtained data and the calculated probability. The generated graph illustrates the probability of a particular sentence to be a headnote for a specific number of occurrences of the predetermined feature in that sentence. The X-axis of the graph illustrates features values or the number of occurrences of a predetermined feature in a particular sentence. Y-axis of the graph illustrates the probability value for that particular sentence to be a headnote.

In an alternate embodiment of the present invention, the feature graph generating module 110 is configured to compute the likelihood by computing the evidence of a sentence being a headnote or a non-headnote using the obtained data. In an exemplary embodiment of the present invention, the feature graph generating module 110 uses evidence combination techniques such as Dempster-Shafer theory for computing evidence of a sentence being a headnote or a non-headnote. In another exemplary embodiment of the present invention, the feature graph generating module 110 uses Fuzzy Logic for computing evidence of a sentence being a headnote or a non-headnote. In an embodiment of the present invention, the feature graph generating module 110 generates a feature graph corresponding to each predetermined feature using the obtained data and the computed evidence.

Figure 2:
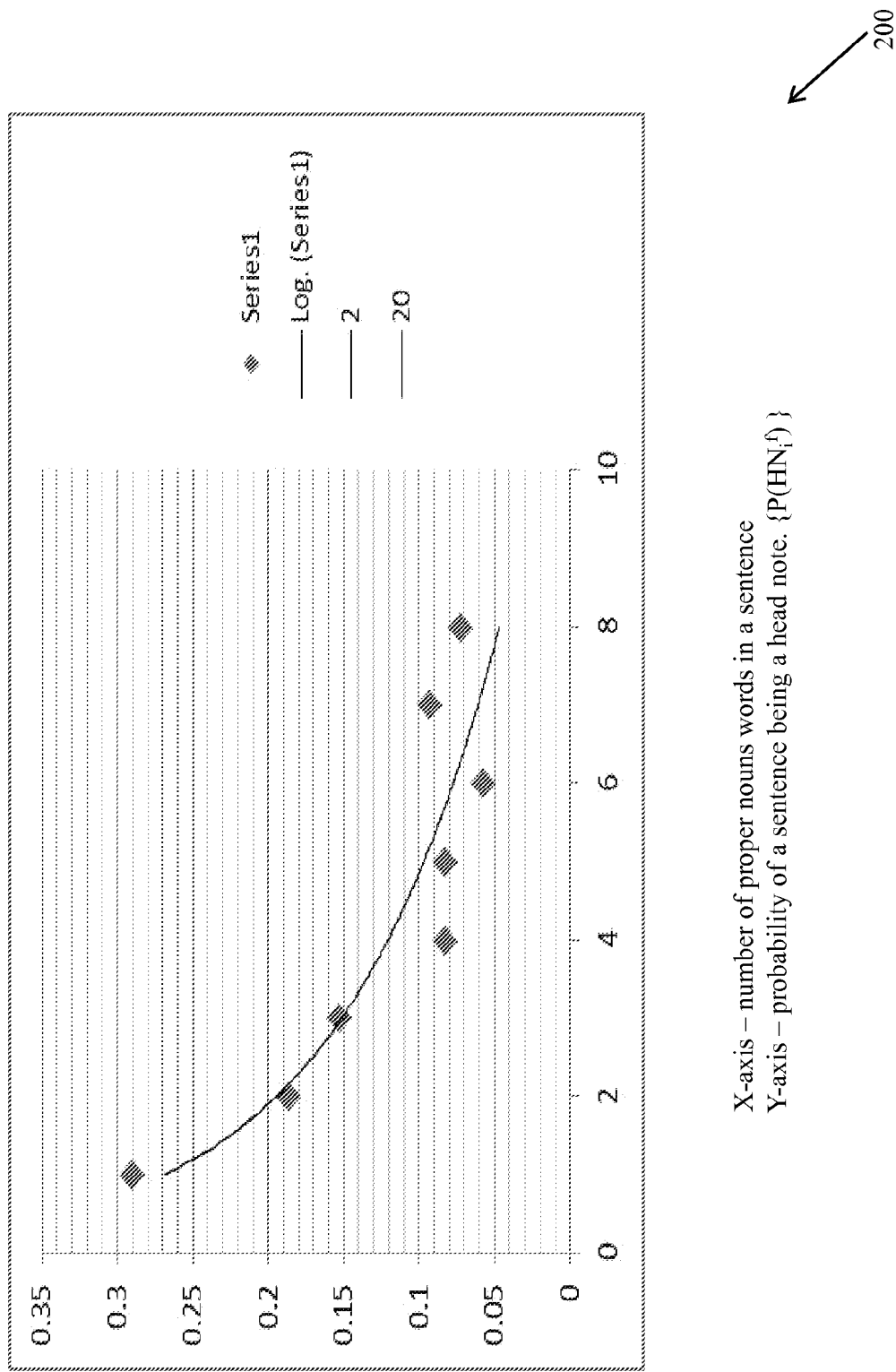
FIG. 2 represents a first exemplary graph illustrating the probability of a sentence being a headnote, in accordance with an embodiment of the present invention.

FIG. 2 represents a first exemplary graph illustrating the probability of a sentence being a headnote, in accordance with an embodiment of the present invention. As shown, X-axis of the graph represents number of proper noun words in the sentence and Y-axis of the graph represents probability of a sentence being a head note. The probability of a sentence being a head note is represented as $\{P(HN_i^f)\}$.

Figure 3:
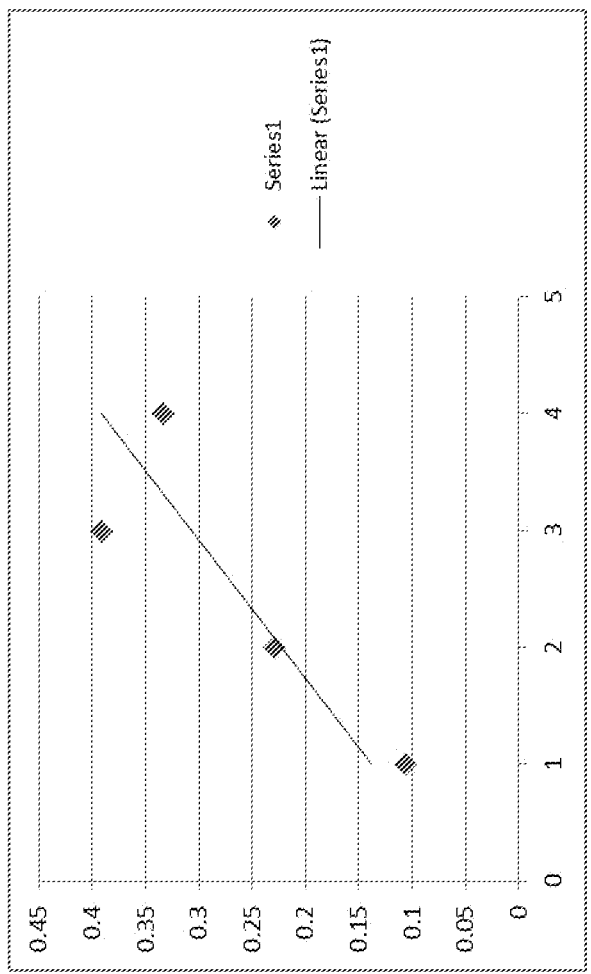
FIG. 3 represents a second exemplary graph illustrating the probability of a sentence being a headnote, in accordance with an embodiment of the present invention.

FIG. 3 represents a second exemplary graph illustrating the probability of a sentence being a headnote, in accordance with another embodiment of the present invention. As shown, X-axis of the graph represents number of provenance feature in the sentence and Y-axis of the graph represents probability of a sentence being a head note. The probability of a sentence being a head note is represented as $\{P(HN_i^f)\}$.

Figure 4:
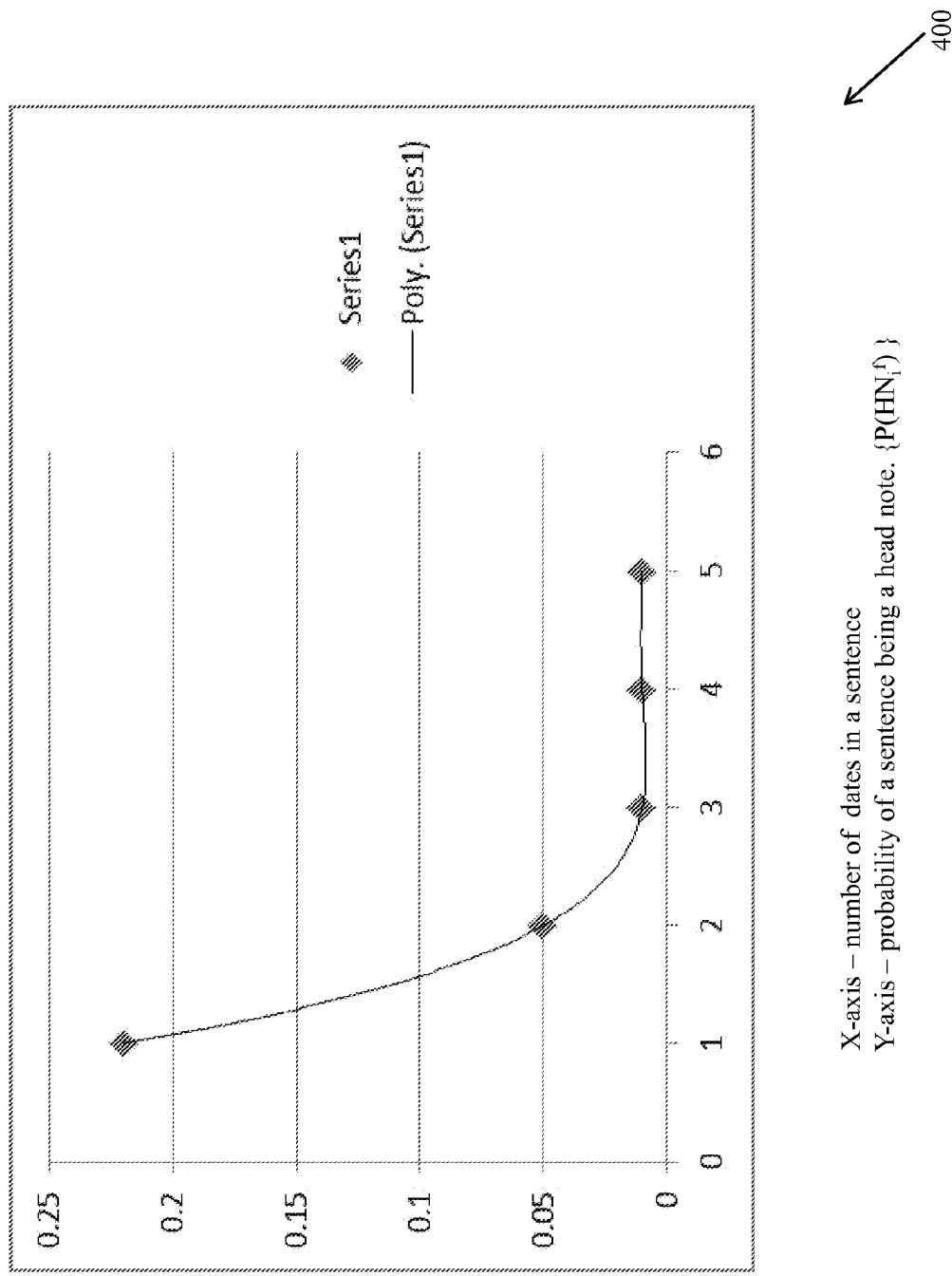
FIG. 4 represents a third exemplary graph illustrating the probability of a sentence being a headnote, in accordance with an embodiment of the present invention.

FIG. 4 represents a third exemplary graph illustrating the probability of a sentence being a headnote, in accordance with yet another embodiment of the present invention. As shown, X-axis of the graph represents number of dates present in the sentence and Y-axis of the graph represents probability of a sentence being a head note. The probability of a sentence being a head note is represented as $\{P(HN_i^f)\}$.

Figure 5:
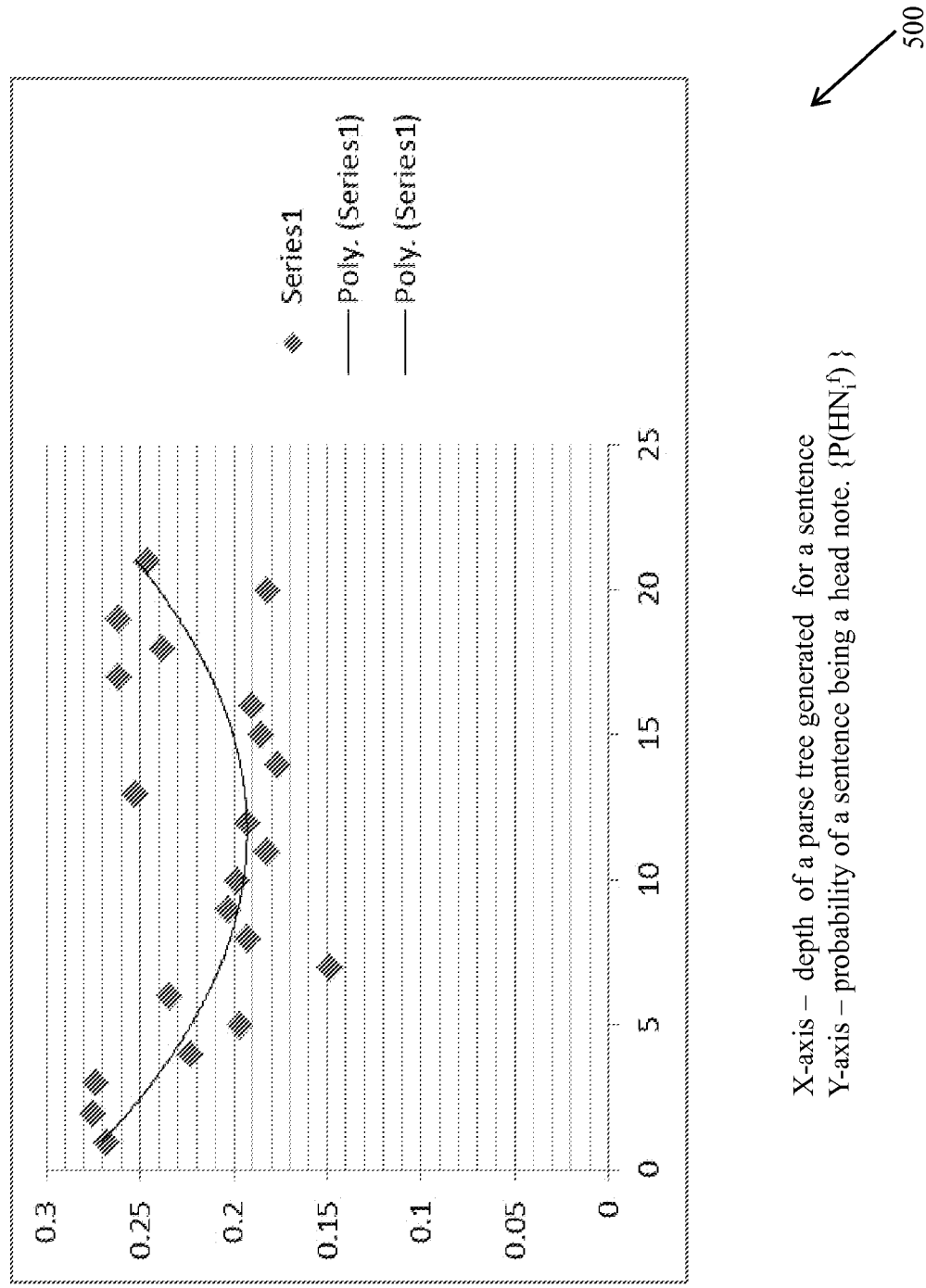
FIG. 5 represents a fourth exemplary graph illustrating the probability of a sentence being a headnote, in accordance with an embodiment of the present invention.

FIG. 5 represents a fourth exemplary graph illustrating the probability of a sentence being a headnote, in accordance with another embodiment of the present invention. As shown, X-axis of the graph represents depth of a parse tree generated for the sentence and Y-axis of the graph represents probability of a sentence being a head note. The probability of a sentence being a head note is represented as $\{P(HN_i^f)\}$.

Figure 6:
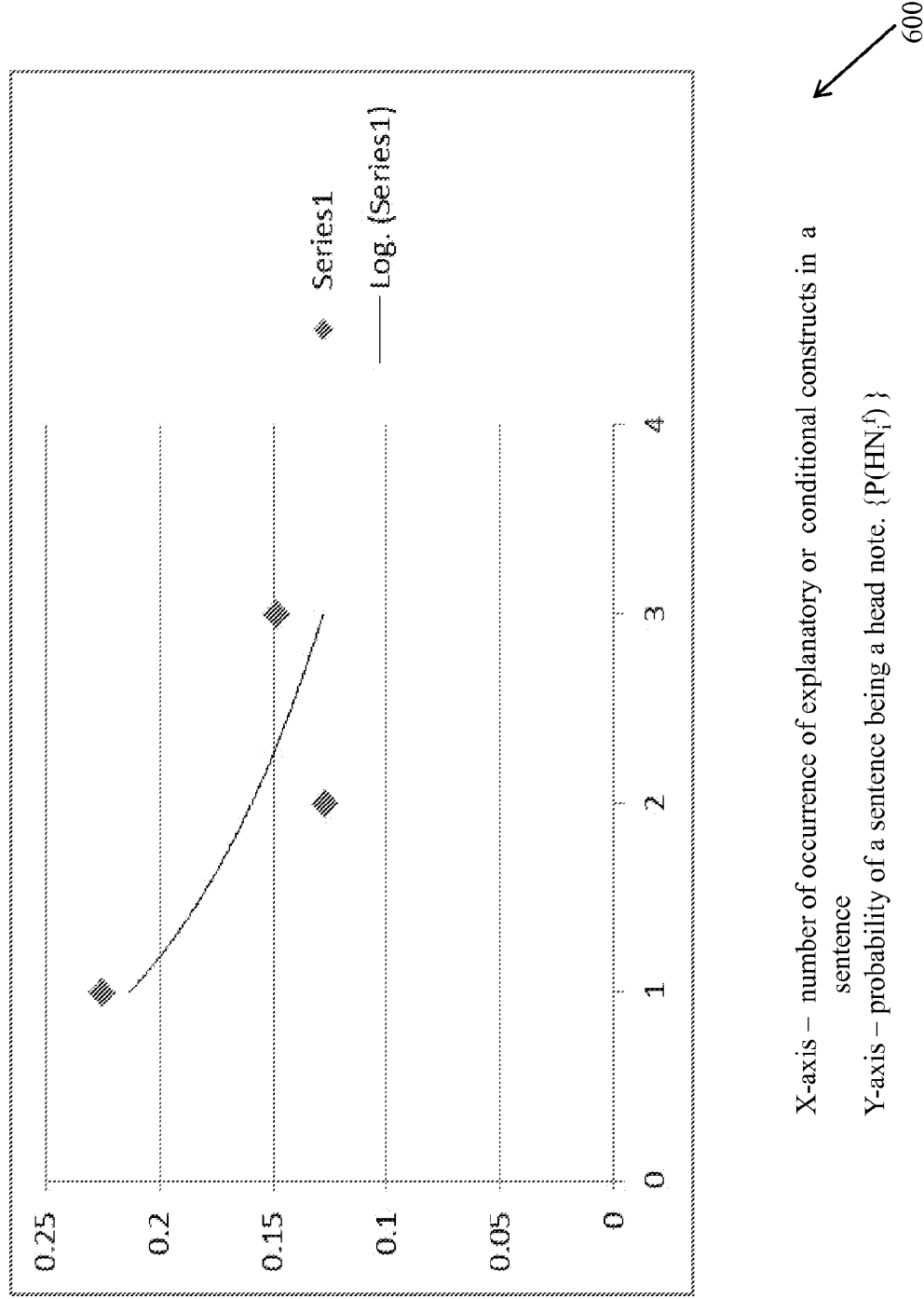
FIG. 6 represents a fifth exemplary graph illustrating the probability of a sentence being a headnote, in accordance with an embodiment of the present invention.

FIG. 6 represents a fifth exemplary graph illustrating the probability of a sentence being a headnote, in accordance with another embodiment of the present invention. As shown, X-axis of the graph represents presence of explanatory or conditional constructs in the sentence and Y-axis of the graph represents probability of a sentence being a head note. The probability of a sentence being a head note is represented as $\{P(HN_i^f)\}$.

Figure 7:
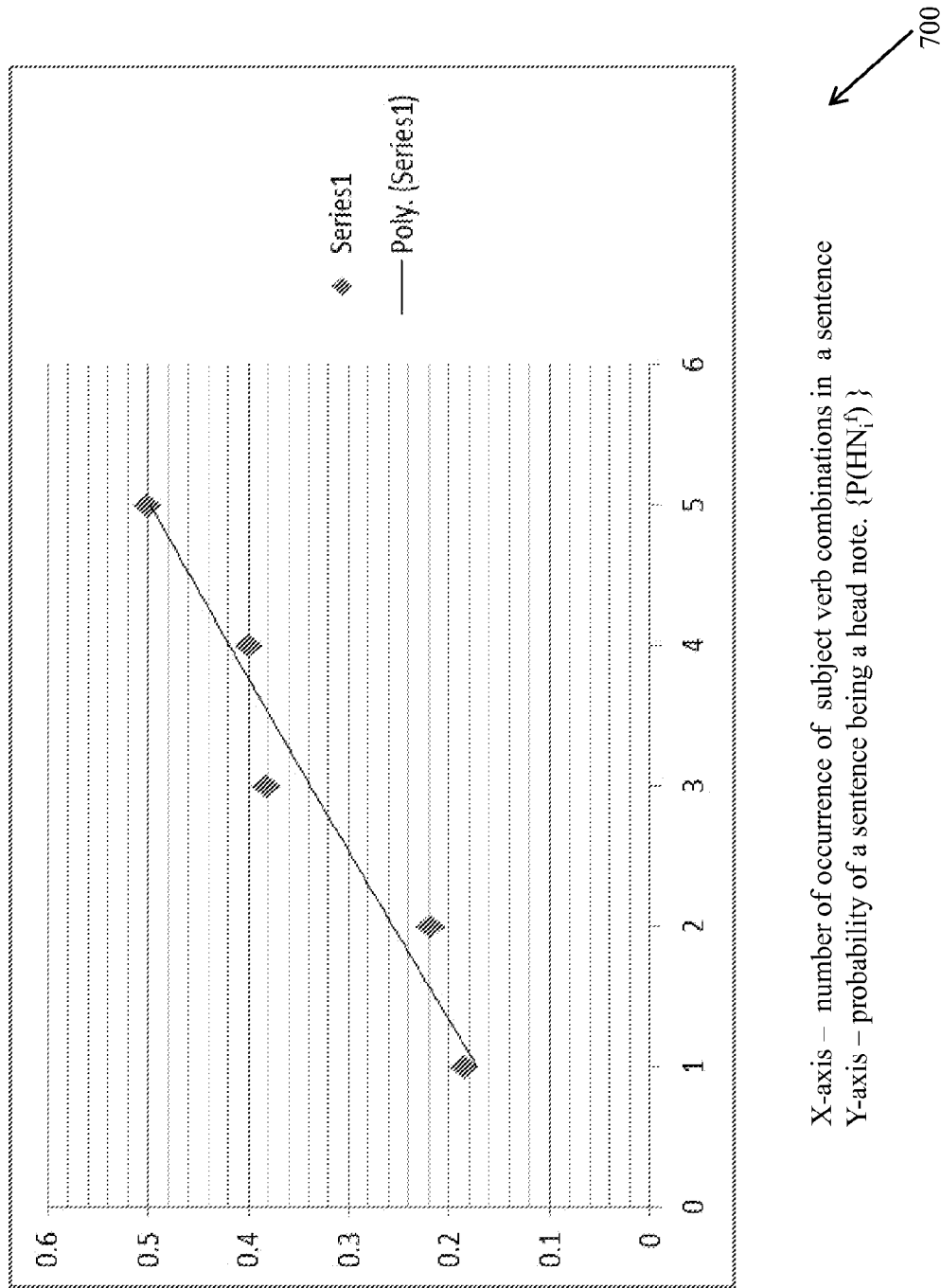
FIG. 7 represents a sixth exemplary graph illustrating the probability of a sentence being a headnote, in accordance with an embodiment of the present invention.

FIG. 7 represents a sixth exemplary graph illustrating the probability of a sentence being a headnote, in accordance with yet another embodiment of the present invention. As shown, X-axis of the graph represents presence of subject verb combinations in the sentence and Y-axis of the graph represents probability of a sentence being a head note. The probability of a sentence being a head note is represented as $\{P(HN_i^f)\}$.

Figure 8:
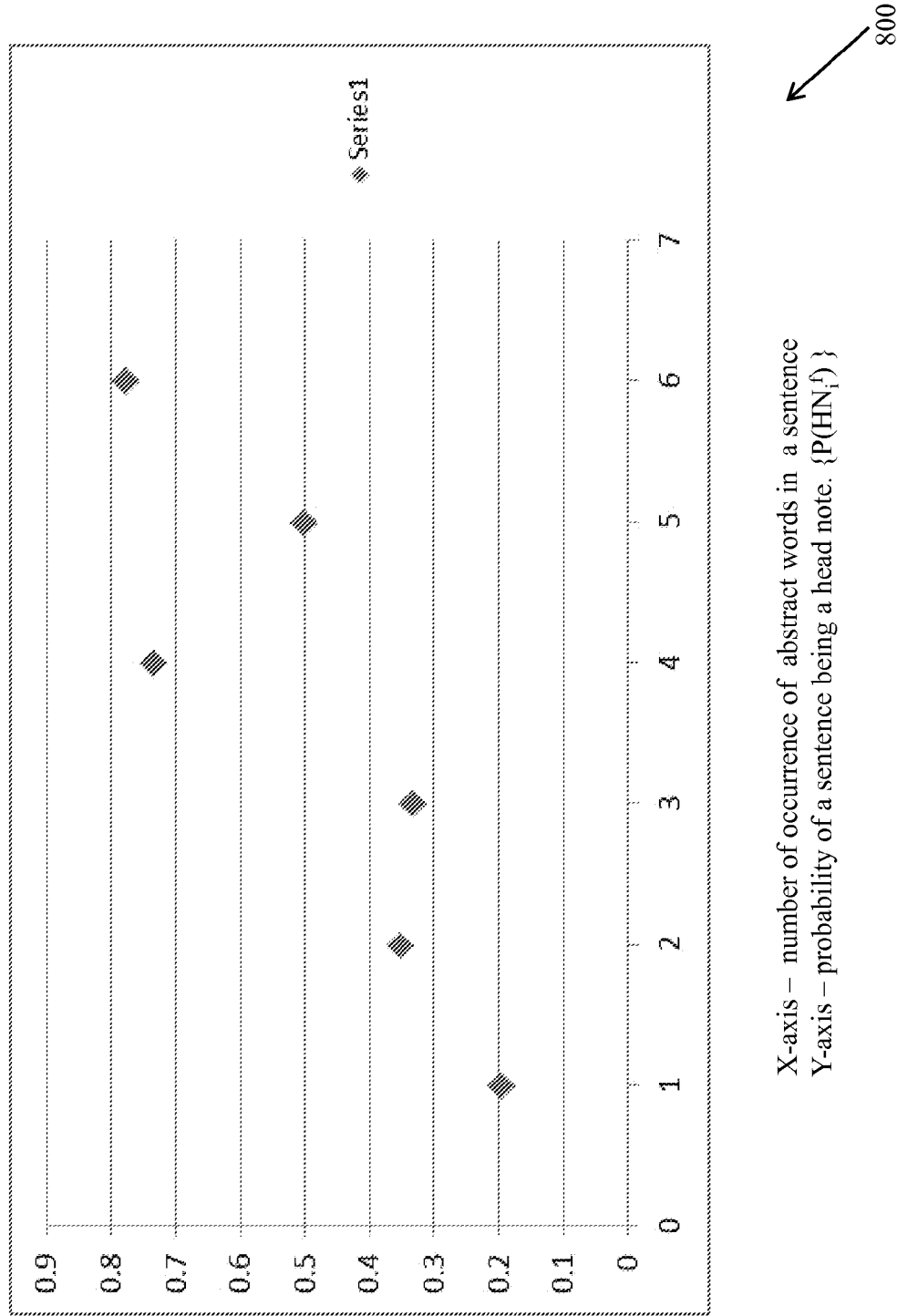
FIG. 8 represents a seventh exemplary graph illustrating the probability of a sentence being a headnote, in accordance with an embodiment of the present invention.

FIG. 8 represents a seventh exemplary graph illustrating the probability of a sentence being a headnote, in accordance with another embodiment of the present invention. As shown, X-axis of the graph represents presence of abstract words in the sentence and Y-axis of the graph represents probability of a sentence being a head note. The probability of a sentence being a head note is represented as $\{P(HN_i^f)\}$.

Figure 9:
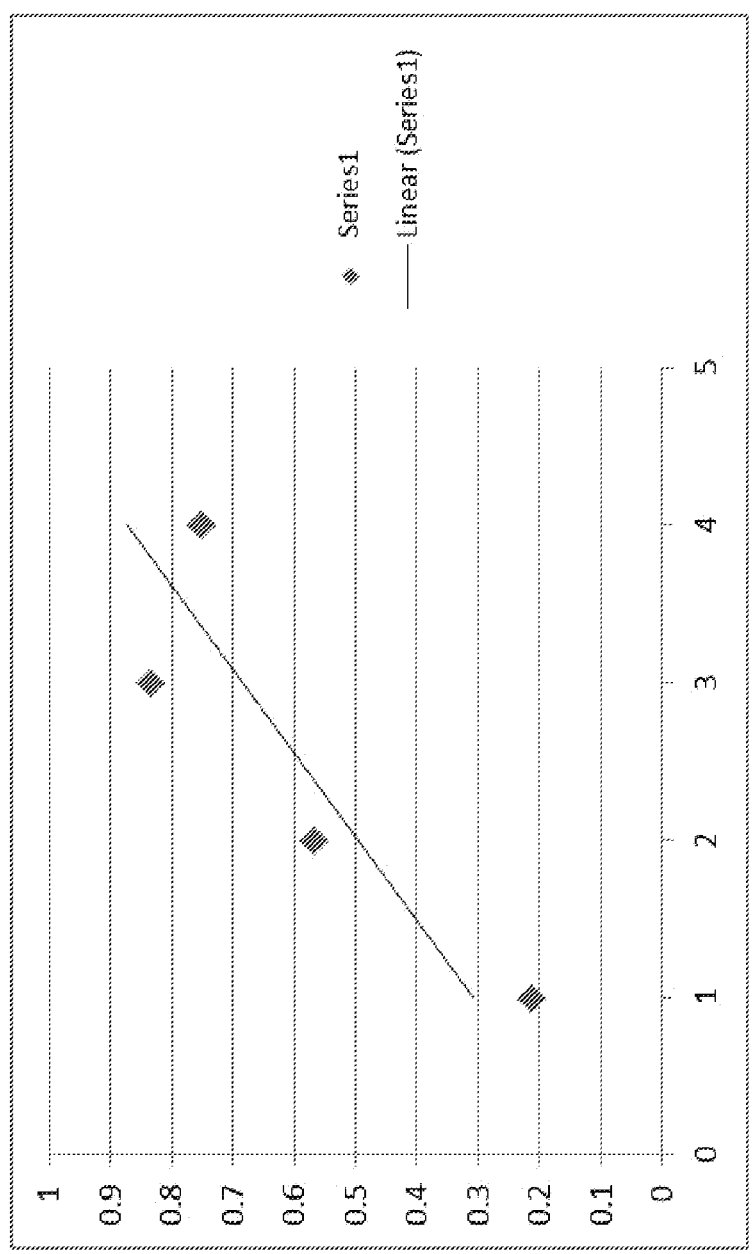
FIG. 9 represents an eight exemplary graph illustrating the probability of a sentence being a headnote, in accordance with an embodiment of the present invention.

FIG. 9 represents an eight exemplary graph illustrating the probability of a sentence being a headnote, in accordance with yet another embodiment of the present invention. As shown, X-axis of the graph represents presence of ellipses in the sentence and Y-axis of the graph represents probability of a sentence being a head note. The probability of a sentence being a head note is represented as $\{P(HN_i^f)\}$.

Figure 10:
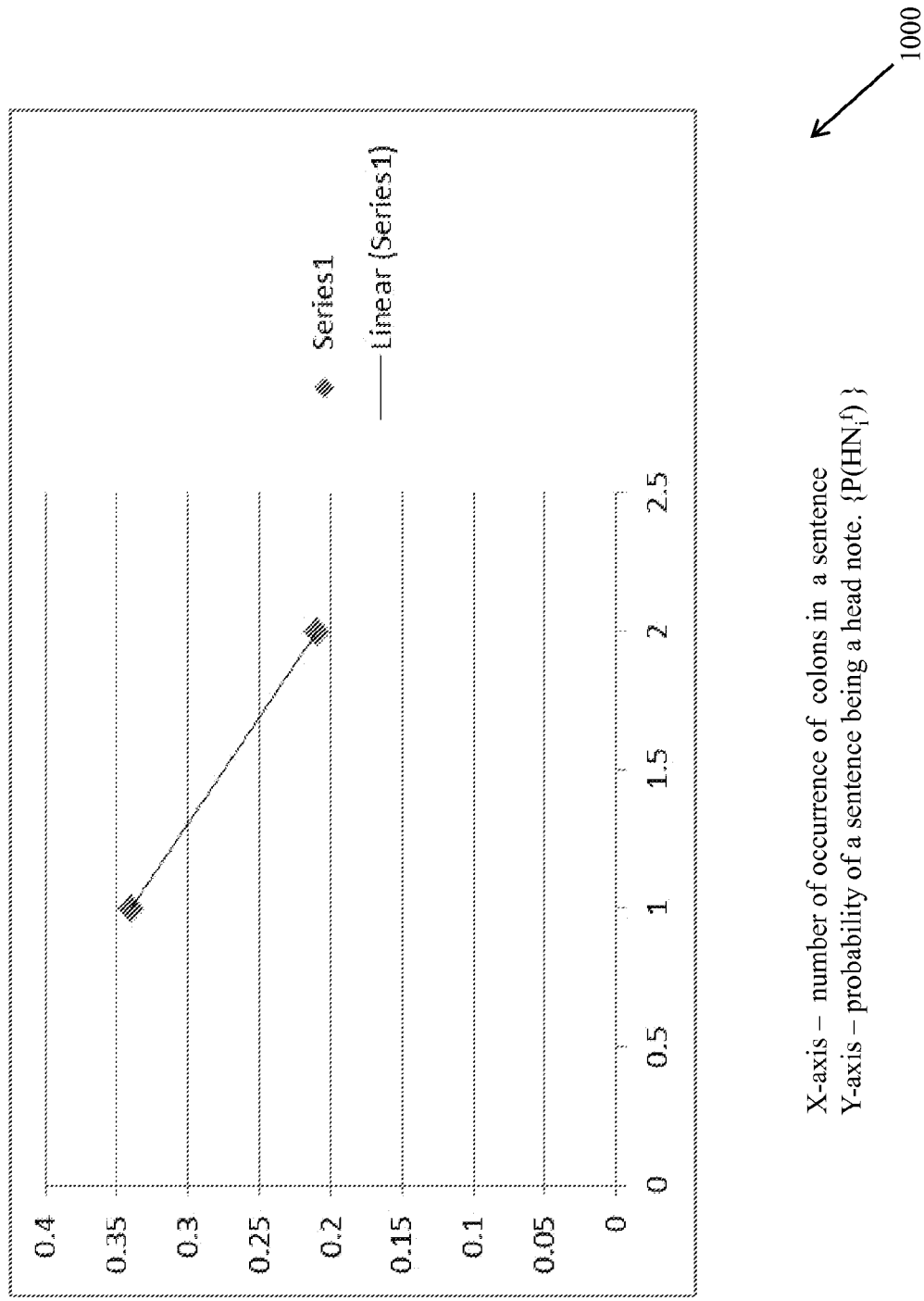
FIG. 10 represents a ninth exemplary graph illustrating the probability of a sentence being a headnote, in accordance with an embodiment of the present invention.

FIG. 10 represents a ninth exemplary graph illustrating the probability of a sentence being a headnote, in accordance with another embodiment of the present invention. As shown, X-axis of the graph represents number of occurrence of colons in the sentence and Y-axis of the graph represents probability of a sentence being a head note. The probability of a sentence being a head note is represented as $\{P(HN_i^f)\}$.

Figure 11:
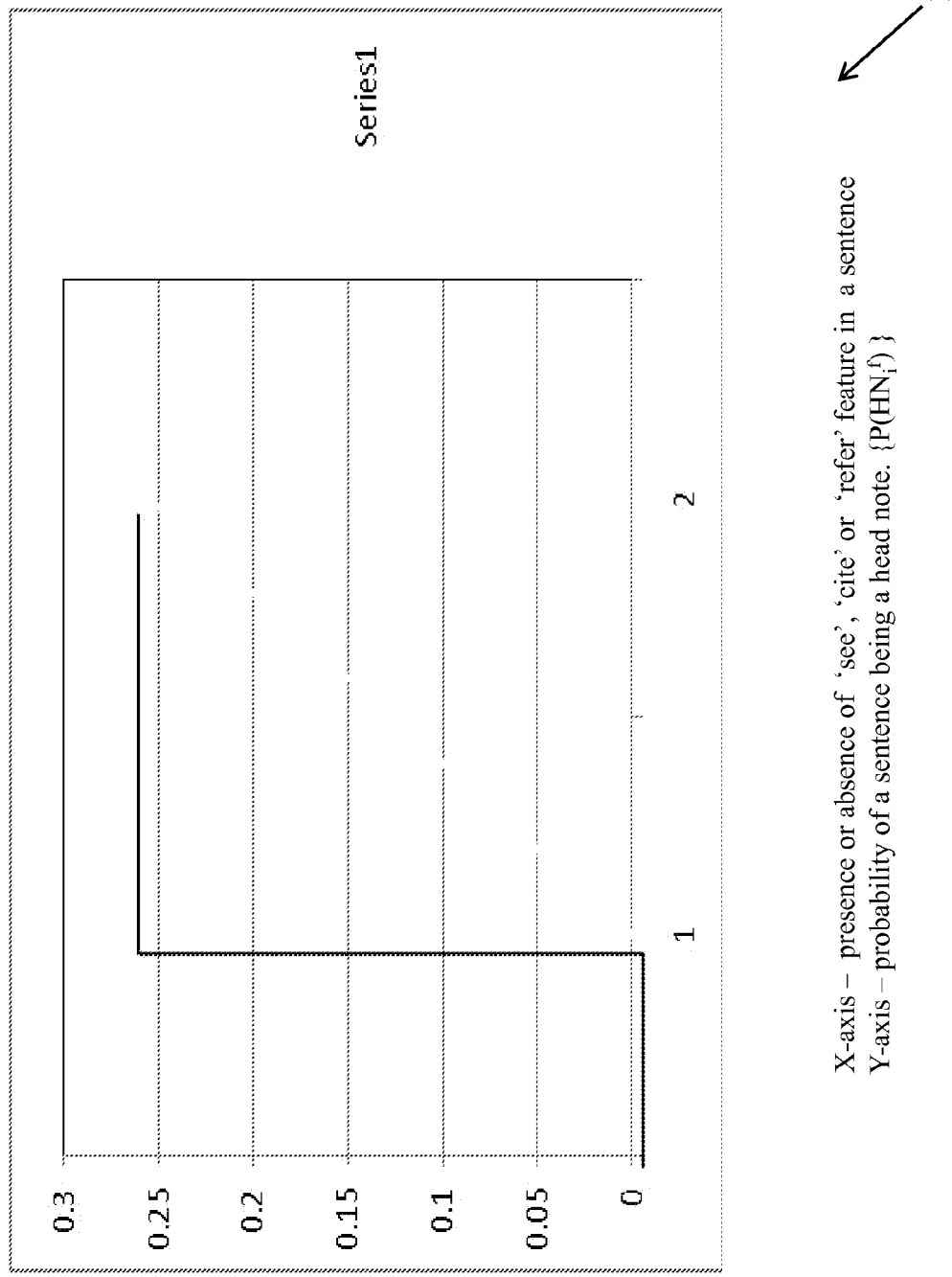
FIG. 11 represents a tenth exemplary graph illustrating the probability of a sentence being a headnote, in accordance with an embodiment of the present invention.

FIG. 11 represents a tenth exemplary graph illustrating the probability of a sentence being a headnote, in accordance with another embodiment of the present invention. As shown, X-axis of the graph represents presence or absence of 'see' or 'cite' or 'refer' features in the sentence and Y-axis of the graph represents probability of a sentence being a head note. The probability of a sentence being a head note is represented as $\{P(HN_i^f)\}$.

Figure 12:
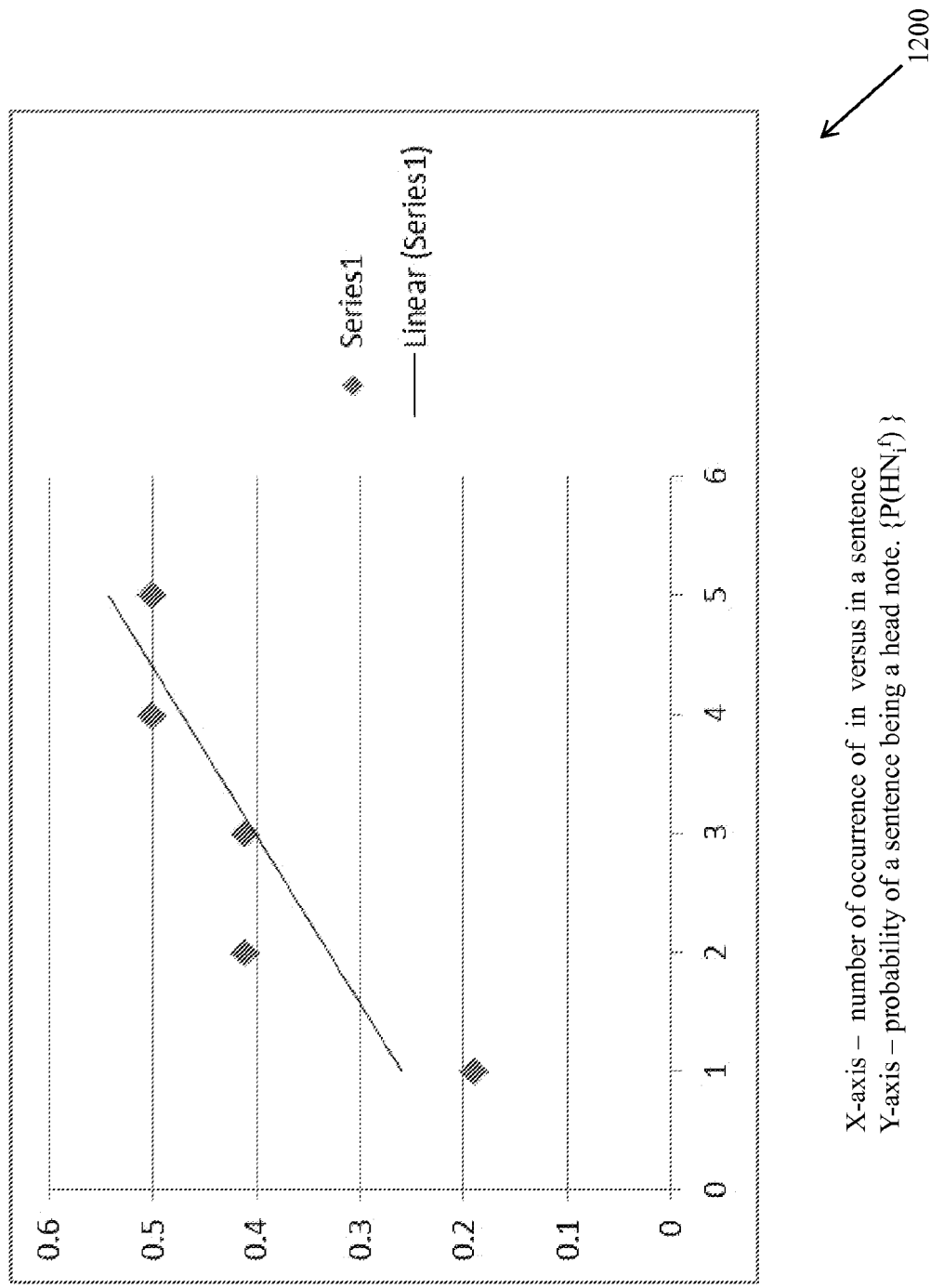
FIG. 12 represents a eleventh exemplary graph illustrating the probability of a sentence being a headnote, in accordance with an embodiment of the present invention.

FIG. 12 represents an eleventh exemplary graph illustrating the probability of a sentence being a headnote, in accordance with an embodiment of the present invention. As shown, X-axis of the graph represents number of occurrence of 'versus' feature in the sentence and Y-axis of the graph represents probability of a sentence being a head note. The probability of a sentence being a head note is represented as $\{P(HN_i^f)\}$.

Figure 13:
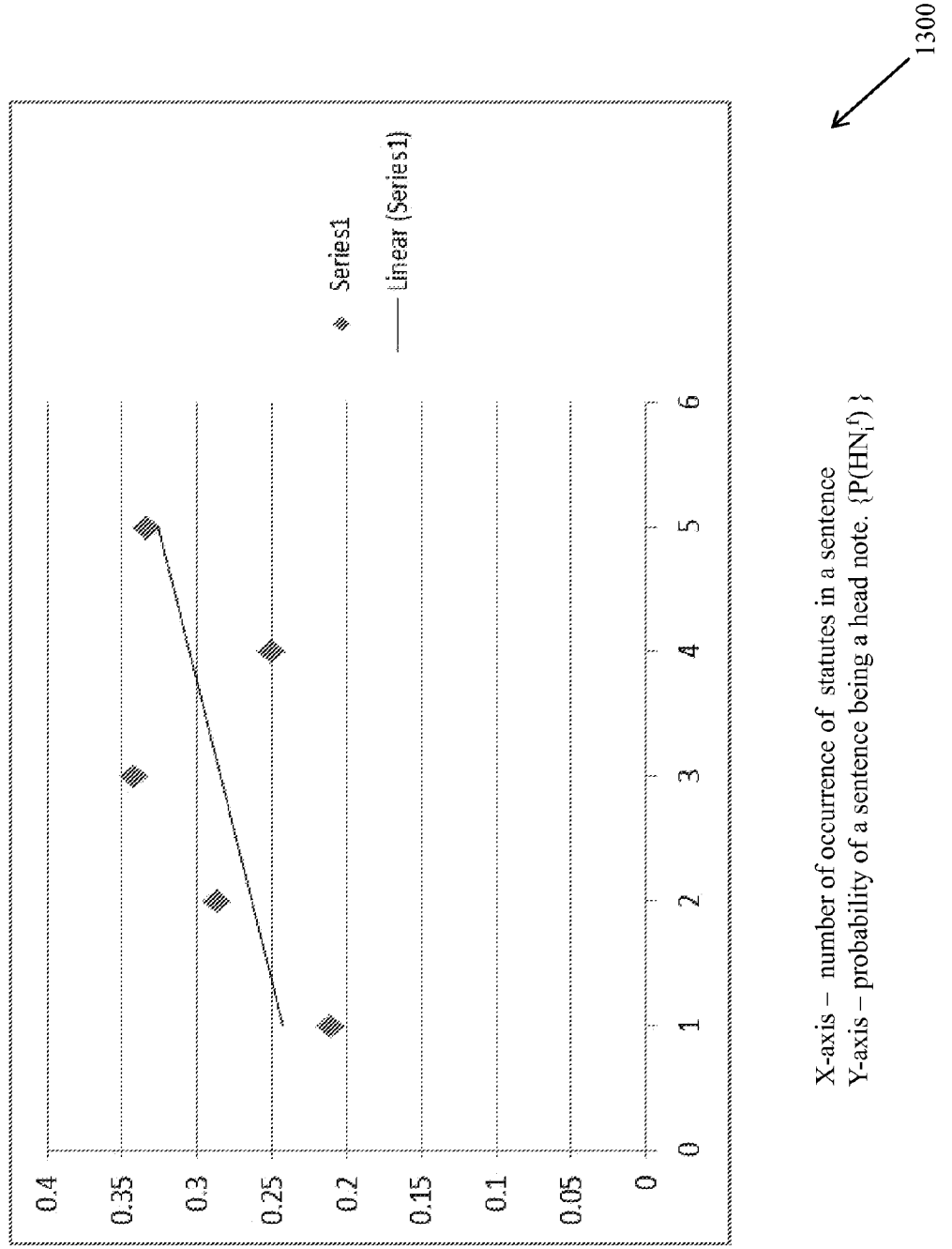
FIG. 13A represents a twelfth exemplary graph illustrating the probability of a sentence being a headnote, in accordance with an embodiment of the present invention.
FIG. 13B represents a thirteenth exemplary graph illustrating the probability of a sentence being a headnote, in accordance with an embodiment of the present invention.
Figure 13:
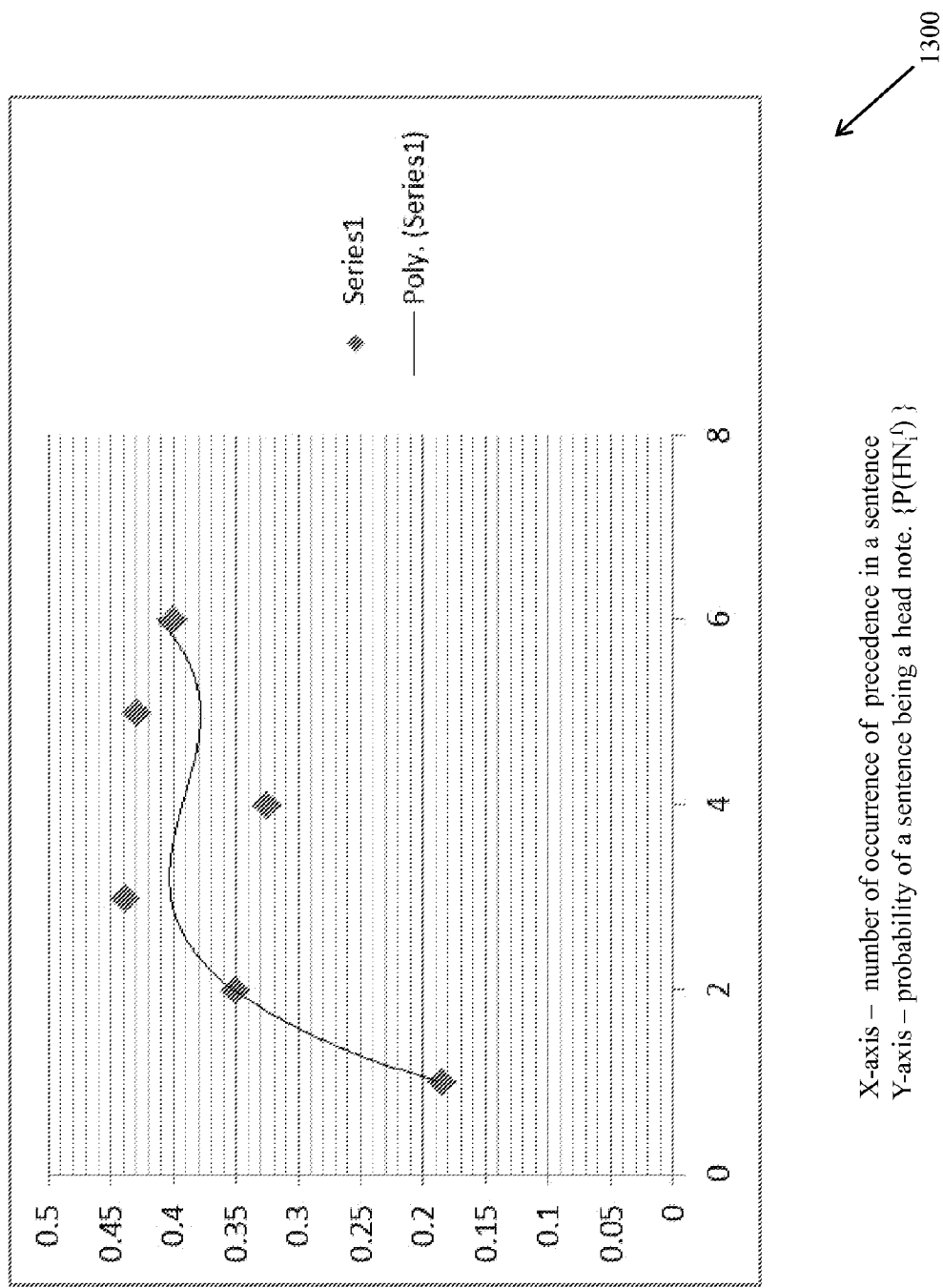

FIGS. 13A and 13B represent a twelfth exemplary graph illustrating the probability of a sentence being a headnote, in accordance with another embodiment of the present invention. As shown, X-axis of the graph represents number of occurrence of statute and precedence feature in the sentence and Y-axis of the graph represents probability of a sentence being a head note. The probability of a sentence being a head note is represented as $\{P(HN_i^f)\}$.

In various embodiments of the present invention, the generated feature graphs corresponding to each predetermined features are stored in the repository 112.

Figure 14:
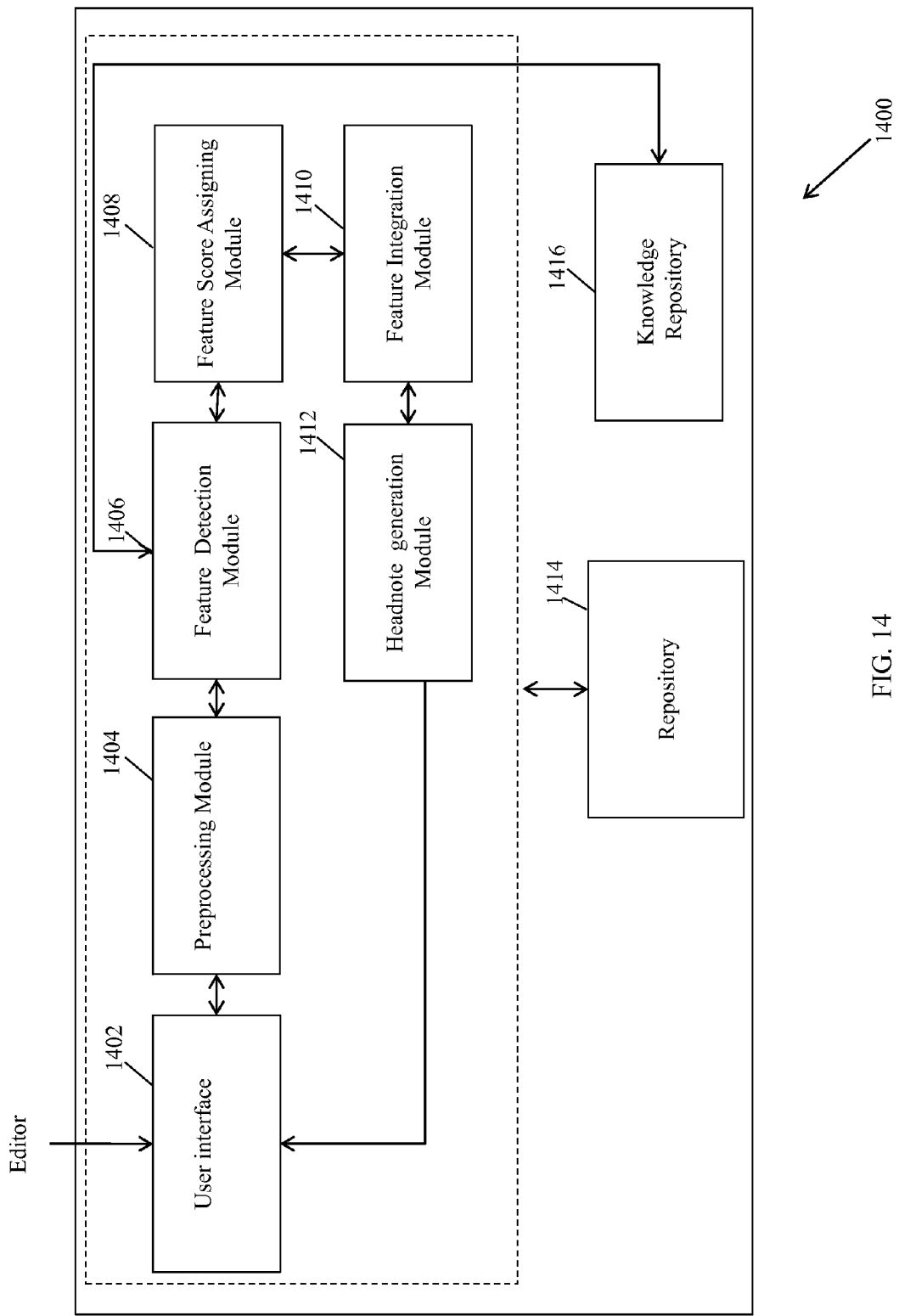
FIG. 14 is a block diagram of a headnote preparation system extracting text in a legal document for preparing headnotes, in accordance with an embodiment of the present invention.

FIG. 14 is a block diagram of a headnote preparation system for extracting text in a legal document for preparing headnotes, in accordance with an embodiment of the present invention. The headnote preparation system 1400 comprises a user interface 1402, a preprocessing module 1404, a feature detection module 1406, a feature score assigning module 1408, a feature integration module 1410 and a headnote generation module 1412, a repository 1414 and a knowledge repository 1416.

In various embodiments of the present invention, the repository 1414 stores the generated feature graphs for each of the predetermined features as described with respect to repository 102 in FIG. 1.

In various embodiments of the present invention, an editor provides a legal document for which headnote is to be prepared to the preprocessing module 1404 via the user interface 1402.

In an embodiment of the present invention, the preprocessing module 1404 scans the text in the legal document and removes unparseable text in the legal document. In an exemplary embodiment of the present invention, the preprocessing module 1404 refers to unparsable text stored in a dictionary (not shown) and identifies the unparseable text in the legal document. The dictionary is developed by analyzing legal documents manually and storing text identified as unparseable in the dictionary. Examples of such text include symbols such as emoticons, numbers, brackets, and Uniform Resource Locator's (URL's) present in the text such as "http:// . . . " etc. In another embodiment of the present invention, the preprocessing module 1404 refers to the dictionary to correct spelling mistakes in the text.

In an embodiment of the present invention, after removing the unparseable text, the preprocessing module 1404 then performs segmentation of the legal document to create chunks. Chunks are groups of words that may refer to entities such as names of people, organizations etc in the legal document. After chunking, text in the legal document is split into sentences. Sentences can be split efficiently using chunks as word groups facilitate to comprehend sentences better than individual words. In an exemplary embodiment of the present invention, the legal document is split into sentences using an OpenNLP parser in-built sentence splitter.

In an embodiment of the present invention, the feature detection module 1406 is configured to receive the preprocessed document from the preprocessing module 1404. The feature detection module 1406 then detects the predetermined features by referring to the repository 1414 and the knowledge repository 1416 as described with respect to the feature identification module 106 in FIG. 1. In various exemplary embodiments of the present invention, the predetermined features may include, but are not limited to, a proper noun feature, a date feature, a provenance feature, a sentence complexity feature, a sentence structure feature, a syntactic structure feature, an abstract-entity extraction feature, a comma feature, an ellipses feature, a colon feature, a see or cite or refer feature, a statute and precedence feature, a sentence position feature and a document structure feature. The list of words pertaining to one or more of the predetermined features is stored in the repository 1414. In addition, the predetermined patterns corresponding to one or more of the predetermined features are also stored in the repository 1414. The knowledge repository 1416 stores the lexical, syntactic and semantic information.

In an embodiment of the present invention, the feature detection module 1406 is configured to tag the detected predetermined features in each sentence of the legal document. The feature detection module 1406 sends information related to the detected predetermined features to the feature score assigning module 1408.

In an embodiment of the present invention, the feature score assigning module 1408 is configured to receive and process the detected predetermined features. The feature score assigning module 1408 is configured to assign a score to each of the predetermined features (referred as feature score) by referring to corresponding feature graphs which are stored in the repository 1414. In an embodiment of the present invention, the feature score assigning module 1408 is configured to ascertain the number of occurrences of predetermined features detected in each sentence of the legal document. The feature score assigning module 1408 then refers to corresponding feature graphs stored in the repository 1414 and assigns a specific feature score to each of the predetermined features detected in each sentence.

In another embodiment of the present invention, the feature score assigning module 1408 is configured to ascertain presence or absence of the predetermined features in each sentence of the legal document. The feature score assigning module 1408 then refers to corresponding feature graphs stored in the repository 1414 and assigns a specific feature score to each of the predetermined features detected in each sentence. In an exemplary embodiment of the present invention, the feature scores assigned to predetermined features in each sentence are the calculated probability values as depicted in the feature graphs corresponding to the predetermined features.

In an embodiment of the present invention, the feature score assigning module 1408 sends information related to feature scores assigned to the detected predetermined features in each sentence of the legal document to the feature integration module 1410.

In an embodiment of the present invention, the feature integration module 1410 is configured to receive and integrate the feature scores in each of the sentences. The result of integration is a final headnote score for each sentence in the legal document.

In an exemplary embodiment of the present invention, the feature integration module 1410 performs the integration by multiplying the feature scores in each sentence and obtaining a final score for each sentence. The final score is the final headnote score. The final score obtained is normalized by multiplying the final score to a predefined multiplication factor. The normalization is performed to render the final score between 0 and 1. In another exemplary embodiment of the present invention, the feature integration module 1410 performs integration of feature scores by providing the feature scores of each of the predetermined features for a specific sentence to a neural network. The neural network computes the final headnote score for the sentence. In yet another exemplary embodiment of the present invention, the feature integration module 1410 performs the integration using a machine learning module such as, but not limited to, support vector machines. In another exemplary embodiment of the present invention, the integration is performed using a rule-based module such as, but not limited to, a decision-tree module for combining evidential information. In yet another exemplary embodiment of the present invention, the feature scores may be integrated using any integration technique for feature based methods of classification. In an exemplary embodiment of the present invention, the integration techniques may be based on evidence combination techniques such as the Dempster-Shafer theory. In another exemplary embodiment of the present invention, the integration techniques may be based on Fuzzy Logic techniques such as min, max, soft-and, soft-or, and weighted sum.

In an embodiment of the present invention, the feature integration module 1410 is configured to send information related to the final headnote score for each sentence to the headnote generation module 1412.

In an embodiment of the present invention, the headnote generation module 1412 is configured to receive information related to the sentences with respective to the final headnote score. The headnote generation module 1412 then converts the received sentences into a markup language format. In an embodiment of the present invention, the markup language format may include an Extensible Markup Language (XML) format. The XML format includes a sentence identification corresponding to each sentence, text of the sentences and the calculated final headnote score for each sentence.

The headnote generation module 1412 is further configured to compare the final headnote score of each sentence with a predetermined threshold. In an embodiment of the present invention, a predetermined threshold is selected by measuring quality of the output of the system 1400 for varying thresholds. The selection of the predetermined threshold is based on a measure for evaluating performance of the system 1400. In an exemplary embodiment of the present invention, the predetermined threshold is selected based on requirement of balancing recall and precision of the system 1400. A high precision of the output of the system 1400 indicates that the sentences tagged as headnotes provided by the system 1400 are sentences that have high probability to be included as headnotes. However, all the headnote sentences in the legal document that is relevant for preparing headnotes may not be provided by the system 1400. A high recall indicates that all the headnote sentences in the legal document that is relevant for preparing headnotes are provided by the system 1400. However, all the headnote sentences provided by the system 1400 may not be relevant for preparing headnotes in legal documents. It is therefore trivial to achieve a recall of 100% and there is a requirement to measure number of non-relevant sentences by computing precision. The predetermined threshold selected therefore should be such that the recall and precision is balanced.

Figure 15:
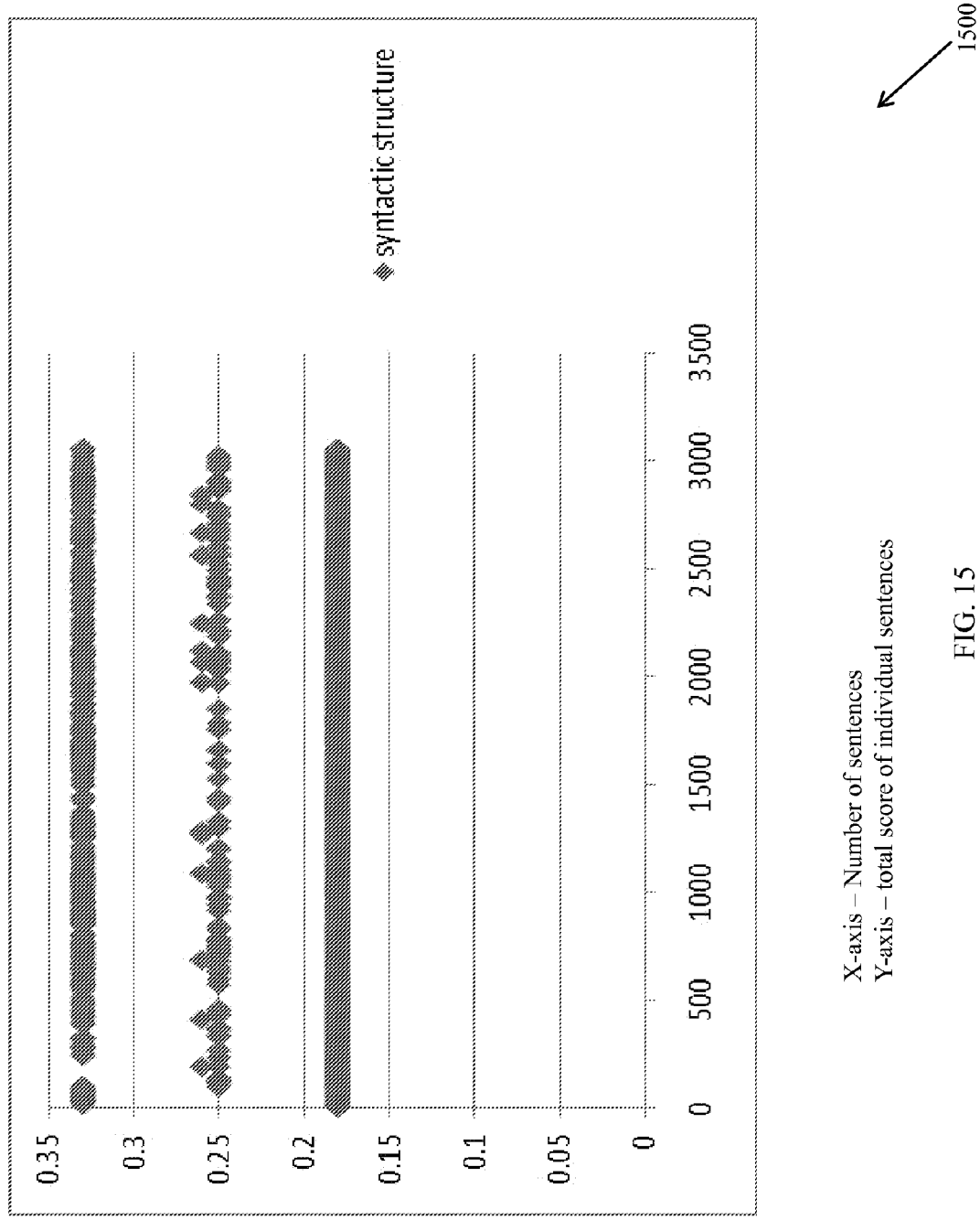
FIG. 15 is an exemplary scatter diagram illustrating distribution between number of sentences and corresponding headnote score, in accordance with an embodiment of the present invention.

Referring to FIG. 15, an exemplary scatter diagram is illustrated with X-Axis representing number of sentences and Y-Axis representing final headnote score of each of the sentences. In an exemplary embodiment of the present invention, it has been observed from the scatter diagram that if '0.18' is selected as the predetermined threshold value, all the sentences with a corresponding final headnote score will be tagged as headnote. The recall is therefore 100% whereas precision is not acceptable. In addition, if '0.3' is selected as the predetermined threshold value from the scatter diagram, it has been observed that the precision is high but the recall is not high. Therefore, to balance between precision and recall the predetermined threshold value selected is '0.25'. In an embodiment of the present invention, the headnote generation module 1412 is configured to tag the sentences as probable headnotes which has a final headnote score above the predetermined threshold value. In an exemplary embodiment of the present invention, sentences with final headnote score above '0.25' is tagged as probable headnote by the headnote generation module 1412.

In an embodiment of the present invention, the headnote generation module 1412 renders the complete legal document which is same as the original legal document along with highlighted text on the user interface 1402. The highlighted text represents text in sentences that are probable headnotes. Using the highlighted text the editor can prepare headnote for the legal document efficiently and accurately.

Figure 16:
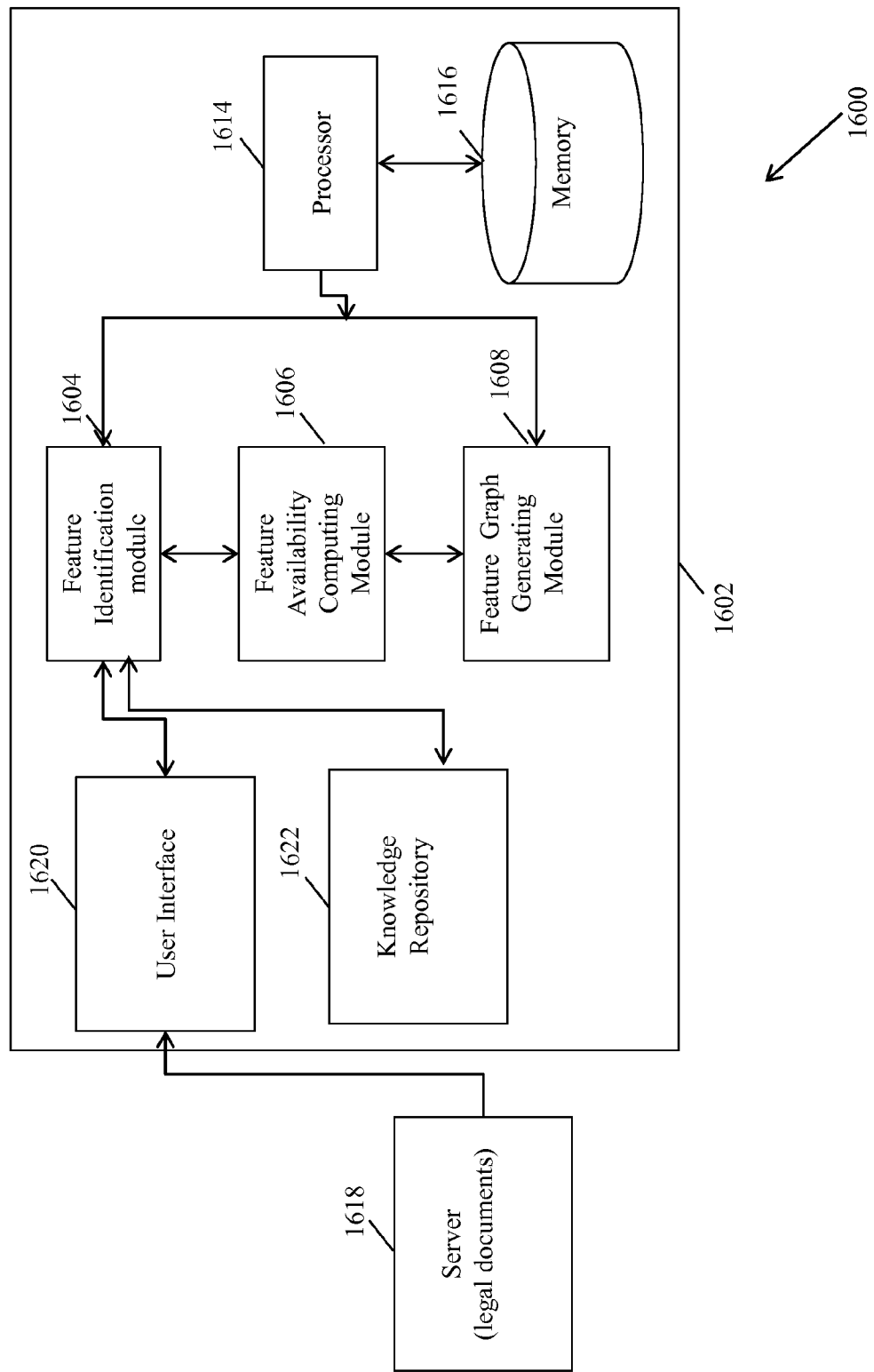
FIG. 16 illustrates a high level block diagram of a system for generating feature graphs for creation of a headnote in a legal document, in accordance with various embodiments of the present invention.

FIG. 16 illustrates a high level block diagram of a system 1602 for generating feature graphs employed for creation of a headnote in a legal document, in accordance with various embodiments of the present invention.

As shown in FIG. 16, the feature identification module 1604, feature availability computing module 1606 and feature graph generating module 1608 operate in communication with a processor 1614 and a memory 1616.

In various embodiments of the present invention, the feature identification module 1604 in communication with the processor 1614 executes a set of program instructions to receive legal documents from a server 1618. The server 1618 is a file server which stores a plurality of legal documents in a database (not shown). The feature identification module 1604 receives multiple legal documents via a user interface 1620. The multiple legal documents are divided into sentences which are manually tagged as headnotes and non-headnotes.

The feature identification module 1604 in communication with the processor 1614 executes a set of program instructions to identify a set of predetermined features in the legal document. In an embodiment of the present invention, the feature identification module 1604 carries out feature detection by using a set of lexical, syntactic, semantic stored in the knowledge repository 1622. The feature identification module 1604 may include a natural language parser which carries out parsing of the sentences in the legal document to facilitate detection of feature using the lexical, syntactic, semantic data in the knowledge repository 1622. The feature availability computing module 1606 and feature graph generating module 1608 in communication with the processor 1614 executes a set of program instructions to process the identified features and generate feature graphs. Data related to the feature identification module 1604, feature availability computing module 1606 and feature graph generating module 1608 may be stored in the memory 1616 for performing the functionalities in accordance with various embodiments of the present invention.

Figure 17:
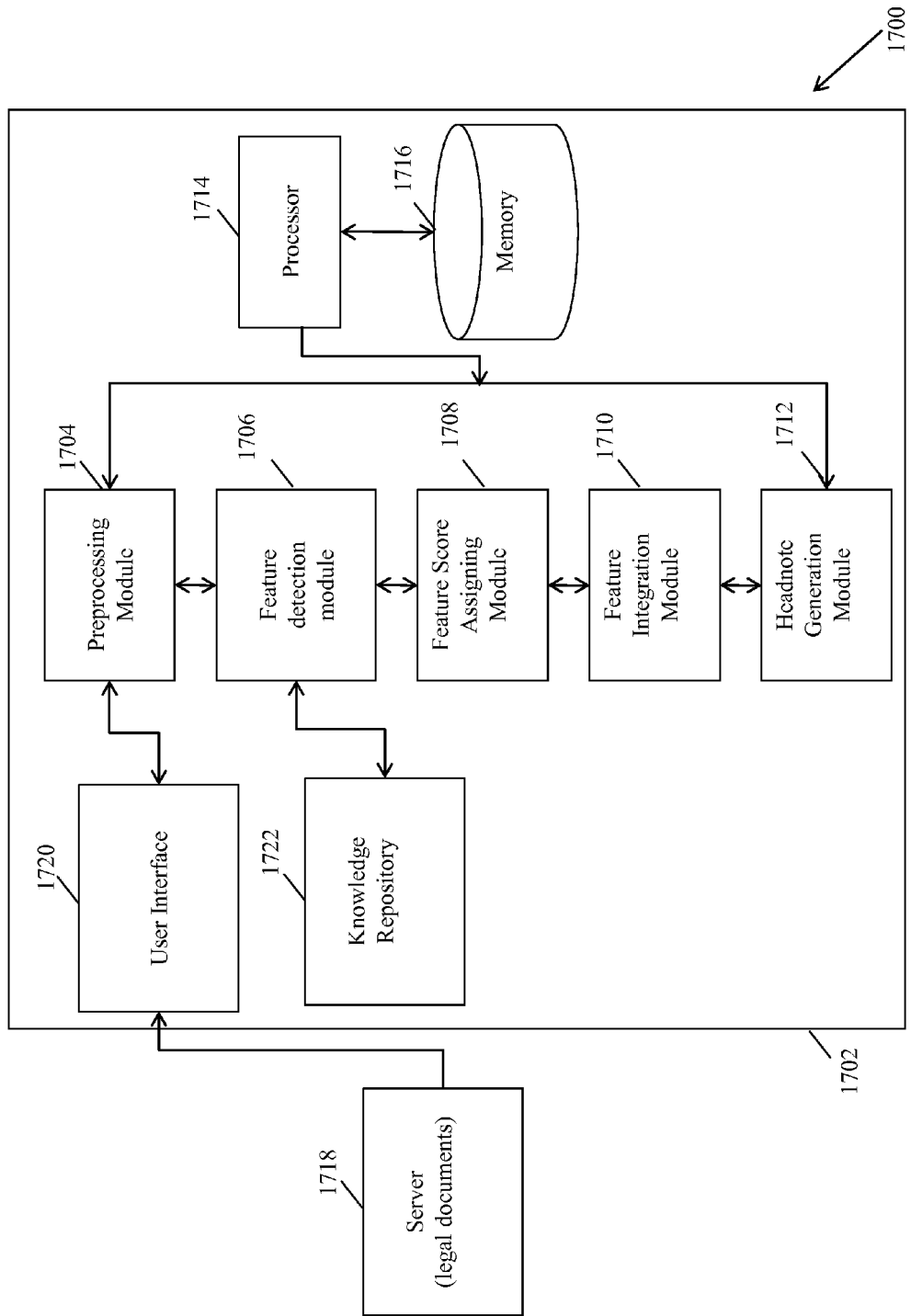
FIG. 17 illustrates a high level block diagram of a headnote preparation system for extracting text in a legal document for preparing headnotes, in accordance with various embodiments of the present invention.

FIG. 17 illustrates a high level block diagram of a headnote preparation system 1702 for extracting text in a legal document for preparing headnotes, in accordance with various embodiments of the present invention.

As shown in FIG. 17, the preprocessing module 1704, feature detection module 1706, feature score assigning module 1708, feature integration module 1710, and headnote generation module 1712 within the exemplary system 1702 operate in communication with a processor 1714 and a memory 1716.

In various embodiments of the present invention, the preprocessing module 1704 in communication with the processor 1714 executes a set of program instructions to receive a legal document from a server 1718. The server 1718 is a file server which stores a plurality of legal documents in a database (not shown). The preprocessing module 1704 receives a legal document via a user interface 1720. The preprocessing module 1704 in communication with the processor 1714 executes a set of program instructions to remove or correct un-parseable text from the legal document. In an embodiment of the present invention, the preprocessing module 1704 interacts with the knowledge repository 1722 to refer to a domain dependent dictionary to correct spelling in the legal document. The preprocessing module 1704 in communication with the processor 1714 executes a set of program instructions to split the legal document into sentences. The memory 1716 may store one or more software programs which can be used by the preprocessing module 1704 for splitting the legal document into sentences.

The feature detection module 1706 in communication with the processor 1714 executes a set of program instructions to receive the sentences from the preprocessing module 1704. The feature detection module 1706 then detects the predetermined features of text in the legal document for which headnote is to be prepared. In an embodiment of the present invention, the feature detection module 1706 carries out feature detection by using a set of lexical, syntactic, semantic stored in the knowledge repository 1722. The feature detection module 1706 may include a natural language parser which carries out parsing of the sentences in the legal document for detection of feature using the lexical, syntactic, semantic data in the knowledge repository 1722. The feature score assigning module 1708, feature integration module 1710, and headnote generation module 1712 in communication with the processor 1714 executes a set of program instructions to process the detected features and generate a legal document with highlighted text that represents probable headnotes. Data related to the preprocessing module 1704, feature vector extraction module 1706, feature score assigning module 1708, feature integration module 1710, and headnote generation module 1712 may be stored in the memory 1716 for performing the functionalities in accordance with various embodiments of the present invention.

Figure 18:
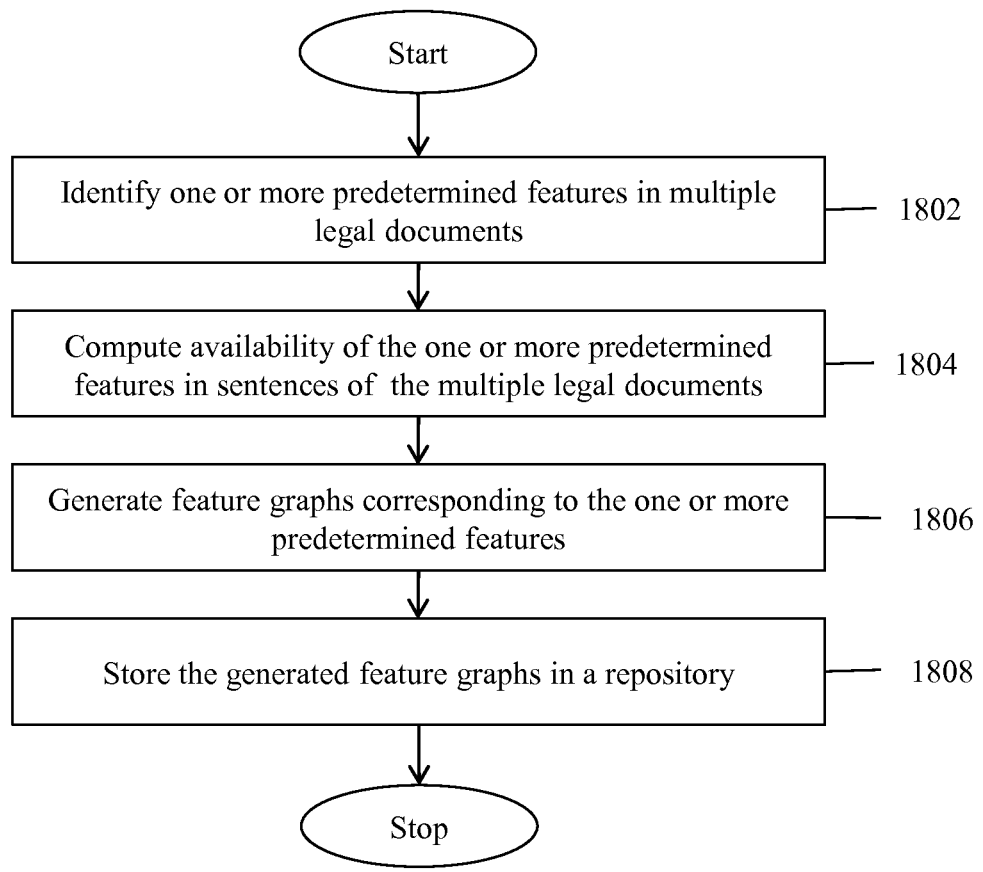
FIG. 18 illustrates a flowchart of a method for generating feature graphs for creation of a headnote in a legal document, in accordance with an embodiment of the present invention.

FIG. 18 illustrates a flowchart of a method for generating feature graphs employed for creation of a headnote in a legal document, in accordance with an embodiment of the present invention.

At step 1802, one or more predetermined features are identified in multiple legal documents. In an embodiment of the present invention, the multiple legal documents contain a headnote section. The multiple legal documents are analyzed manually and all the sentences in the multiple legal documents are manually tagged as headnote and non-headnote by referring to the text in the headnote section provided in each of the legal documents.

In addition, text in the sentences of each of the legal documents which are identified as headnote and non-headnote is analyzed to manually determine a set of features. The set of features are determined based on grammatical constituents of the text in the sentences. In various exemplary embodiments of the present invention, the predetermined features may include, but are not limited to, a proper noun feature, a date feature, a provenance feature, a sentence complexity feature, a sentence structure feature, a syntactic structure feature, an abstract-entity extraction feature, a comma feature, an ellipses feature, a colon feature, a see or cite or refer feature, a statute and precedence feature, a sentence position feature and a document structure feature.

The multiple legal documents tagged as headnote and non-headnote are received and the one or more predetermined features are identified in each of the sentences of the multiple legal documents by using lexical, syntactic and semantic information stored in a knowledge repository. The identified predetermined features in each sentence of the multiple legal documents are then tagged.

At step 1804, availability of the predetermined features in each of the multiple legal documents is computed. In an embodiment of the present invention, the number of predetermined features in each sentence of the multiple legal documents is computed (i.e. frequency of occurrence). In another embodiment of the present invention, the presence or absence of the predetermined features in each sentence of the multiple legal documents is computed. In an embodiment of the present invention, in all the legal documents, the number of manually identified headnote sentences that contain the predetermined features is ascertained. In addition, in all the legal documents, the number of non-headnote sentences that contain the predetermined features is ascertained.

At step 1806, feature graph corresponding to each of the predetermined feature is generated. In an embodiment of the present invention, using the data related to the feature availability, likelihood of a sentence being a headnote is calculated. In an exemplary embodiment of the present invention, likelihood of headnote sentence may be determined by calculating probability. The probability of a sentence being a headnote is calculated using the following equation:

$$P(HN_i^f) = \frac{\text{Number of Head note sentences with the value } i \text{ for the feature}}{\text{Number of Head note sentences with the value } i \text{ for the feature } (HN_i^f) + \text{Number of Non head note Sentences } (NHN) \text{ with the value } i \text{ for the feature } (NHN_i^f)}$$

where P(HNif)=probability of a sentence being a head note (HN) for a feature (f) given the feature value (i) of the feature. Feature value (i) represents the number of predetermined feature or frequency of occurrence of the predetermined feature.

In an embodiment of the present invention, the calculated probability data is stored in a repository. Using the calculated probability data and feature availability computation data, a feature graph is generated corresponding to each predetermined feature. The generated graph illustrates the probability of a particular sentence to be a headnote for a specific number of occurrences of the predetermined feature in that sentence. The X-axis of the feature graph illustrates features values or the number of occurrences of a predetermined feature in a sentence. Y-axis of the graph illustrates the probability value for the sentence to be a headnote.

In an alternate embodiment of the present invention, likelihood of a headnote sentence may be determined by computing evidence for a sentence being a headnote or a non-headnote using the obtained data. In an exemplary embodiment of the present invention, evidence may be computed using one or more evidence combination techniques such as Dempster-Shafer theory. In another exemplary embodiment of the present invention, evidence may be computed using Fuzzy Logic. In an embodiment of the present invention, feature graphs corresponding to each predetermined feature are generated using the obtained data and the computed evidence.

At step 1808, the generated feature graphs are stored in a repository. In an embodiment of the present, a feature graph corresponding to the one or more predetermined features are stored in a repository.

Figure 19:
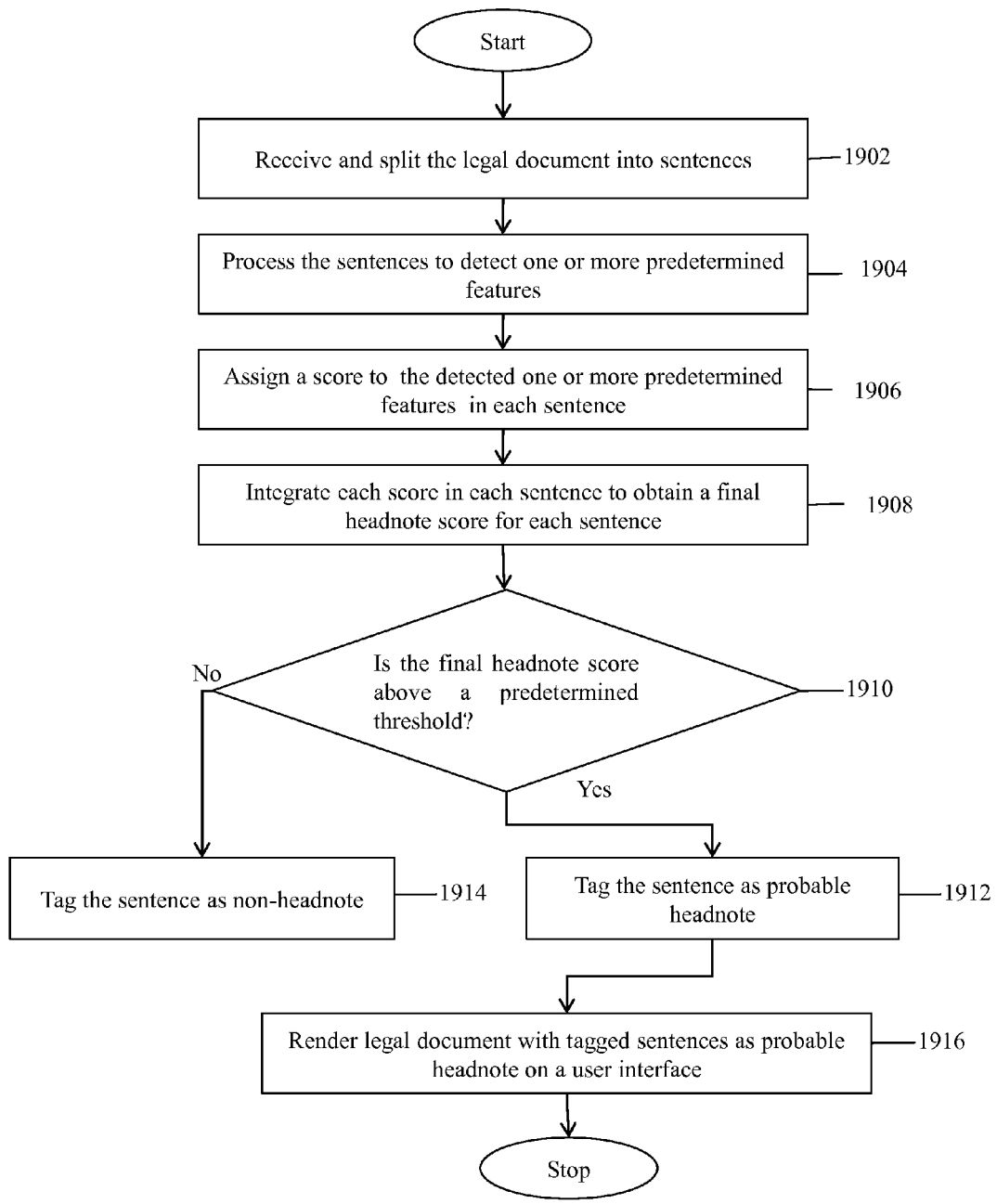
FIG. 19 illustrates a flowchart of a method for extracting text in a legal document for preparing headnotes, in accordance with an embodiment of the present invention.

FIG. 19 illustrates a flowchart of a method for extracting text in a legal document for preparing headnotes, in accordance with an embodiment of the present invention.

At step 1902, a legal document is received and the legal document is split into sentences. In an embodiment of the present invention, the legal document is preprocessed to remove un-parseable text. The un-parseable text may include, but are not limited to, any symbol in the text of the legal document which is not from an acceptable language such as English language, numbers, punctuation marks and brackets. The text in the legal document is split into sentences.

For example, the following may be a piece of text from a legal document which is received as input.

"This court set a hearing for Dec. 2, 2008 and notified the following agencies, none of whom sent representatives to appear at the hearing: Rockland County District Attorney, Rockland County Sheriff, Rockland County Attorney, and Clarkstown Police Department. Mrs. Bastiani and her husband appeared at the hearing. The court received sworn testimony from Mrs. Bastiani along with the assistance of her husband, Flavio. The burden of establishing proper cause for the issuance of a full carry permit is placed upon the applicant. (Kaplan v Bratton, 249 AD2d199 at 201, 673 NYS2d 66 [1998].) The issuance of a pistol permit is a privilege subject to reasonable regulation, and in order to receive a full carry permit the applicant must show a special need for self-protection distinguishable from that of the general community. (Id, at 201, 673 NYS2d 66.) Even the fact that one carries large amounts of cash or valuable articles or supplies in areas noted for criminal activity does not demonstrate per se "a special need for self-protection distinguishable from that of the general community of the person engaged in the same business or profession." (Matter of Klenosky v New York City Police Dept., 75 AD2d 793, 428 NYS2d 256 [1980], affd 53 NY2d 685, 421 NE2d 503, 439 NYS2d108 [1981].)"

After preprocessing the legal document, the following is the output.

Sentence 1: This court set a hearing for Dec. 2, 2008 and notified the following agencies, none of whom sent representatives to appear at the hearing: Rockland County District Attorney, Rockland County Sheriff, Rockland County Attorney, and Clarkstown Police Department.
Sentence 2: Mrs. Bastiani and her husband appeared at the hearing.
Sentence 3: The court received sworn testimony from Mrs. Bastiani along with the assistance of her husband, Flavio.

At step 1904, the sentences are processed to detect predetermined features in each sentence. In an embodiment of the present invention, the predetermined features pertain to sentences which are manually identified as either a headnote or a non-headnote. The predetermined features are detected using lexical, syntactic and semantic information stored in a knowledge repository. Examples of predetermined features include, but are not limited to, proper noun feature, provenance feature, date feature, sentence complexity feature, sentence structure feature, syntactic structure feature, abstract-entity feature, comma, ellipse, colon feature, see or cite or refer feature, versus feature, statute and precedence feature, sentence position feature, and document structure feature. For example, the following sentence of the legal document is received as input.

"This court set a hearing for Dec. 2, 2008 and notified the following agencies, none of whom sent representatives to appear at the hearing: Rockland County District Attorney, Rockland County Sheriff, Rockland County Attorney, and Clarkstown Police Department."
The predetermined features detected for the abovementioned sentence may include the following:
proper noun feature: "Rockland County District Attorney", "Rockland County Sheriff", "Rockland County Attorney", "Clarkstown Police Department" and date feature i.e. Date: "Dec. 2, 2008".

At step 1906, a score is assigned to each detected predetermined feature in each sentence. In an embodiment of the present invention, frequency of occurrence of the predetermined features in each sentence is determined Feature graphs corresponding to each of the predetermined features are stored in the knowledge repository. By referring to the feature graphs, a probability value is determined for each predetermined feature. A score is then assigned to each predetermined feature each sentence based on the probability value.

In an exemplary embodiment of the present invention, for the proper noun feature detected as "Rockland County District Attorney", "Rockland County Sheriff", "Rockland County Attorney", "Clarkstown Police Department" the frequency of occurrence is detected as seven. For the date feature detected "Dec. 2, 2008", the number of occurrence is one.

By referring to the feature graph for proper noun feature (illustrated in FIG. 2) the probability value for seven occurrences of the proper noun feature is determined as 0.07. The score assigned to the proper noun feature is therefore 0.07. By referring to the feature graph for date feature (illustrated in FIG. 4) the probability value for one occurrence of the date feature is determined as 0.22. The score assigned to the date feature is therefore 0.22

In another embodiment of the present invention, the presence or absence of the predetermined features in each sentence is determined. Feature graphs corresponding to each of the predetermined features are stored in the knowledge repository. By referring to the feature graphs, a probability value is determined for each predetermined feature. A score is then assigned to each predetermined feature each sentence based on the probability value.

In an exemplary embodiment of the present invention, the presence or absence of the see or cite or refer feature may be determined. Based on the finding, the corresponding feature graph stored in the repository may be referred (illustrated in FIG. 11). Based on the probability values illustrated in FIG. 11, the score assigned to 'see' feature is 0.255319. The score assigned to 'cite' feature is 0.333333. The score assigned to 'refer' feature is 0.215021.

At step 1908, the score of each sentence is integrated to obtain a final headnote score for each sentence. In an embodiment of the present invention, the final headnote score indicates the extent to which the predetermined features in the sentence affects the sentence on being a head note or a non headnote. In an embodiment of the present invention, the final headnote score may be obtained by multiplying the score assigned to each predetermined feature detected in a sentence and normalizing the final headnote score obtained. In an exemplary embodiment of the present invention, the final headnote score for the sentence containing proper noun feature and date feature is 0.22*0.07*10=0.154. In another exemplary embodiment of the present invention, the final headnote score may be obtained by calculating the final score using evidence combination techniques such as Dempster-Shafer theory. In yet another exemplary embodiment of the present invention, the final headnote score may be obtained by calculating the final score using Fuzzy Logic.

At step 1910, a check is performed to determine if the final headnote score for a sentence is equal to or more than a predetermined threshold. In an embodiment of the present invention, the predetermined threshold is selected by observing the scatter diagram of the number for sentences with corresponding final headnote scores (illustrated in FIG. 15). Referring to FIG. 15, it is determined that a threshold value of 0.25 provides a balance between recall and precision of the headnote preparation system. The predetermined threshold value selected is therefore 0.25.

At step 1912, if it is determined that the final headnote score for a sentence is equal to or more than the predetermined threshold, the text in the sentence is tagged as probable headnote. At step 1914, if it is determined that the final headnote score for a sentence is less than the predetermined threshold, the text in the sentence is tagged as non headnote. In an exemplary embodiment of the present invention, the final headnote score of 0.154 for the sentence containing proper noun and date feature is below the predetermined threshold 0.25. The sentence is therefore tagged as non-headnote.

At step 1916, the legal document with text tagged as probable headnote is rendered on a user interface. In an embodiment of the present invention, the sentences in the legal document are combined to form the complete legal document. The complete legal document along with the tagged text as probable headnote is rendered on the user interface. The legal document is presented to an editor wherein the tagged sentences are highlighted to indicate to the editor where to focus his attention in order to locate headnotes.

In an exemplary embodiment of the present invention, the following sentence is not rendered as highlighted text.

"This court set a hearing for Dec. 2, 2008 and notified the following agencies, none of whom sent representatives to appear at the hearing: Rockland County District Attorney, Rockland County Sheriff, Rockland County Attorney, and Clarkstown Police Department.

Advantageously, work load of the editor is reduced as relevant parts of the legal document for preparing headnotes is presented accurately. This leads to lesser strain on the editor which in turn improves the efficiency in the process of processing huge legal documents to identify text relevant for preparing headnotes.

The present invention may be implemented in numerous ways including as a, method, or a computer program product such as a computer readable storage medium or a computer network wherein programming instructions are communicated from a remote location.

Various embodiments of the present invention, may be implemented via one or more computer systems. The computer system includes at least one processing unit and memory. The processing unit executes program instructions and may be a real or a virtual processor. The computer system is not intended to suggest any limitation as to scope of use or functionality of described embodiments. Typical examples of a computer system include a general-purpose computer, a programmed microprocessor, a micro-controller, a peripheral integrated circuit element, and other devices or arrangements of devices that are capable of implementing the steps that constitute the method of the present invention. In an embodiment of the present invention, the memory may store software for implementing various embodiments of the present invention.

The present invention may suitably be embodied as a computer program product for use with a computer system. The method described herein is typically implemented as a computer program product, comprising a set of program instructions which is executed by a computer system or similar device. The set of program instructions may be a series of computer readable codes stored on a tangible medium, such as a computer readable storage medium, for example, diskette, CD-ROM, ROM, or hard disk, or transmittable to a computer system, via a modem or other interface device, over either a tangible medium, including but not limited to optical or analogue communications lines. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method for generating feature graphs employed for creation of a headnote in a legal document, the method comprising:

identifying one or more predetermined features in a plurality of legal documents, wherein the one or more predetermined features are based on grammatical constituents of text in the legal document, the plurality of legal documents being manually identified as headnote and non headnote;

obtaining data related to the availability of the one or more identified predetermined features in the sentences manually identified as headnote and non-headnote in the plurality of legal documents;

computing likelihood of a sentence being a headnote based on the obtained data;

generating feature graphs corresponding to each predetermined feature based on the computed likelihood and obtained data; and storing the generated feature graphs in a repository.

2. The method of claim 1, wherein the one or more predetermined features comprise at least one of: a proper noun feature, a date feature, a provenance feature, a sentence complexity feature, a sentence structure feature, a syntactic structure feature, an abstract-entity extraction feature, a comma feature, an ellipses feature, a colon feature, a see or cite or refer feature, a versus feature, a statute and precedence feature, a sentence position feature and a document structure feature.

3. The method of claim 1, wherein identifying the one or more predetermined features in the plurality of legal documents comprises identifying the one or more predetermined features by referring to at least one of: lexical, syntactic and semantic information stored in a knowledge repository.

4. The method of claim 1, wherein obtaining data related to the availability of the one or more identified predetermined features in the sentences manually identified as headnote and non headnote comprises:

determining feature values for each of the identified predetermined features, wherein the feature values represent the number of occurrences of the identified predetermined features;

obtaining number of headnote sentences for a specific feature value of each of the identified predetermined features; and obtaining number of non headnote sentences for the specific feature value of each of the identified predetermined features.

5. The method of claim 4, wherein computing likelihood of a sentence being a headnote based on the obtained data comprises calculating probability of a sentence being a headnote using the equation:

$$P(HN_i^f) = \frac{\text{Number of Head note sentences with the value } i \text{ for the feature}}{\text{Number of Head note sentences with the value } i \text{ for the feature } (HN_i^f) + \text{Number of Non head note Sentences } (NHN) \text{ with the value } i \text{ for the feature } (NHN_i^f)}$$

where P(HNif)=probability of a sentence being a head note (HN) for a feature (f) given the feature value (i) of the feature. Feature value (i) represents the number of occurrence of the predetermined feature.

6. The method of claim 5, wherein generating feature graphs corresponding to each predetermined feature based on the computed likelihood and obtained data comprises:
generating a feature graph where the X-Axis represents the feature values of the predetermined feature and the Y-Axis represents the calculated probability values corresponding to each feature value.

7. The method of claim 1, wherein computing likelihood of a sentence being a headnote based on the obtained data comprises computing evidence for a sentence being a headnote or a non-headnote using Dempster-Shafer theory or any other evidence combination techniques.

8. The method of claim 1, wherein computing likelihood of a sentence being a headnote based on the obtained data comprises computing evidence for a sentence being a headnote or a non-headnote using one or more Fuzzy Logic techniques.

9. A method for extracting text in a legal document for preparation of headnotes, the method comprising:
detecting one or more predetermined features in each sentence of the legal document, wherein the one or more predetermined features are based on grammatical constituents of text in the legal document;
computing occurrence of the detected one or more predetermined features in each sentence of the legal document;
retrieving feature graphs corresponding to the one or more detected predetermined features from a repository, wherein the feature graphs represent likelihood of a sentence being a headnote for a specific number of occurrences of the predetermined features in the sentences;
analyzing the detected one or more predetermined features based on the computed occurrence of the one or more detected predetermined features and the retrieved feature graphs; and
rendering the legal document with text tagged as headnote on a user interface based on the analysis.

10. The method of claim 9, wherein analyzing the detected one or more predetermined features based on the computed occurrence of the one or more detected predetermined features and the retrieved corresponding feature graphs comprises:
assigning a score to the one or more predetermined features detected in each sentence by referring to the retrieved feature graphs corresponding to the one or more detected predetermined features;
combining the assigned score in each sentence to obtain a final headnote score for each sentence;
comparing the final headnote score with a predetermined threshold; and
tagging text in each sentence as headnote and non headnote based on the comparison.

11. A method for extracting text in a legal document for preparation of headnotes, the method comprising:
detecting one or more predetermined features in each sentence of the legal document, wherein the one or more predetermined features are based on grammatical constituents of text in the legal document;
computing occurrence of the detected one or more predetermined features in each sentence of the legal document;
assigning a score to each predetermined feature detected in each sentence by referring to feature graphs corresponding to each predetermined feature, wherein the feature graphs are retrieved from a repository;
combining the assigned score in each sentence to obtain a final headnote score for each sentence;
comparing the final headnote score with a predetermined threshold;
tagging text in each sentence as headnote and non headnote based on the comparison; and
rendering the legal document with text tagged as headnote on a user interface.

12. The method of claim 11 further comprising:
removing unparseable text from the legal document;
chunking the received legal document; and
splitting the legal document into sentences by using the chunks.

13. The method of claim 11, wherein the one or more predetermined features comprise at least one of: a proper noun feature, a date feature, a provenance feature, a sentence complexity feature, a sentence structure feature, a syntactic structure feature, an abstract-entity extraction feature, a comma feature, an ellipses feature, a colon feature, a see or cite or refer feature, a versus feature, a statute and precedence feature, a sentence position feature and a document structure feature.

14. The method of claim 11, wherein detecting the one or more predetermined features in each sentence of the legal document comprises detecting the one or more predetermined features in each sentence of the legal document by referring to lexical, syntactic and semantic information stored in a knowledge repository.

15. The method of claim 14, wherein detecting the one or more predetermined features in each sentence of the legal document comprises detecting the one or more predetermined features based on a predetermined pattern stored in a repository.

16. The method of claim 14, wherein detecting the one or more predetermined features in each sentence of the legal document comprises detecting the one or more predetermined features using a list of words stored in a repository.

17. The method of claim 11, wherein computing occurrence of the detected one or more predetermined features in each sentence of the legal document comprises at least one of: computing the number of occurrences of the detected one or more predetermined features in each sentence and computing the presence or absence of the detected one or more predetermined features in each sentence.

18. The method of claim 17, wherein assigning a score to each predetermined feature detected in each sentence by referring to feature graphs corresponding to each predetermined feature comprises:
   determining a probability value in the feature graph that corresponds to the computed occurrence of the one or more predetermined features; and
   assigning a score to the one or more predetermined features based on the probability value.

19. The method of claim 11, wherein combining the assigned score in each sentence to obtain a final headnote score for each sentence comprises: multiplying the score assigned to each predetermined feature in each sentence to obtain a final headnote score for each sentence.

20. The method of claim 19, wherein the final headnote score obtained is normalized.

21. The method of claim 11, wherein combining the assigned score in each sentence to obtain a final headnote score for each sentence comprises combining the scores assigned to each predetermined feature in the sentence using evidence combination based integration techniques.

22. The method of claim 11, wherein combining the assigned score in each sentence to obtain a final headnote score for each sentence comprises combining the scores assigned to each predetermined feature in each sentence using Fuzzy Logic based integration techniques.

23. The method of claim 11 further comprising:
   referring to a scatter diagram representing distribution of number of sentences and corresponding final headnote scores;
   selecting a final headnote score that provides a balance between recall and precision; and
   selecting the final headnote score as the predetermined threshold.

24. The method of claim 23, wherein comparing the final headnote score with a predetermined threshold comprises selecting the final headnote score of each sentence that are equal to or more than the predetermined threshold.

25. The method of claim 24, wherein tagging text in each sentence as headnote and non headnote based on the comparison comprises tagging the sentences with the selected final headnote score as headnote and tagging the sentences with final headnote score less than the predetermined threshold as non headnote.

26. A system for generating feature graphs employed for creation of a headnote in a legal document, the system comprising:
   a feature identification module configured to identify one or more predetermined features in a plurality of legal documents, wherein the one or more predetermined features are based on grammatical constituents of text in the legal document and further wherein the feature identification module receives the plurality of legal documents manually identified as headnote and non headnote from a user interface;
   a feature availability computing module configured to:
      obtain data related to the availability of the one or more identified predetermined features in the sentences manually identified as headnote and non headnote in the plurality of legal documents; and
      store the obtained data in a repository; and
   a feature graph generating module configured to:
      compute likelihood of a sentence being a headnote based on the data stored in the repository;
      generate feature graphs corresponding to each predetermined feature based on the computed likelihood and stored data; and
      store the generated feature graphs in the repository.

27. The system of claim 26, wherein the one or more predetermined features comprise at least one of: a proper noun feature, a date feature, a provenance feature, a sentence complexity feature, a sentence structure feature, a syntactic structure feature, an abstract-entity extraction feature, a comma feature, an ellipses feature, a colon feature, a see or cite or refer feature, a versus feature, a statute and precedence feature, a sentence position feature and a document structure feature.

28. The system of claim 26, wherein the repository is configured to store a set of predetermined features, a list of words corresponding to the predetermined features and a set of predetermined patterns corresponding to the one or more predetermined features.

29. The system of claim 26, wherein the feature identification module identifies one or more predetermined features by referring to a knowledge repository that stores at least one of: lexical, syntactic and semantic information.

30. The system of claim 26, wherein the feature availability computing module obtains data related to the number of headnote sentences and non headnotes for a specific feature value of each of the predetermined features.

31. The system of claim 30, wherein the feature graph generating module computes probability value for a specific feature value of each of the predetermined features using the obtained data.

32. A headnote preparation system for extracting text in a legal document for preparation of headnotes, the system comprising:
   a repository configured to store feature graphs corresponding to one or more predetermined features;
   a feature detecting module configured to detect one or more predetermined features in each sentence of the legal document, wherein the one or more predetermined features are based on grammatical constituents of text in the legal document;
   a feature score assigning module configured to:
      compute occurrence of the detected one or more predetermined features in each sentence of the legal document;
      assign a score to each predetermined feature detected in each sentence by referring to feature graphs corresponding to each predetermined feature stored in the repository based on the computed occurrence of the detected one or more features;
   and
   a feature integrating module configured to combine the assigned score in each sentence to obtain a final headnote score for each sentence;
   a headnote generating module configured to:
      compare the final headnote score with a predetermined threshold;
      tag text in each sentence as headnote and non headnote based on the comparison; and
      render the legal document with text tagged as headnote on a user interface, wherein the text tagged as headnote facilitates a user to prepare a headnote for the legal document.

33. The headnote preparation system of claim 32, wherein the feature score assigning module is configured to:
- determine a probability value in the features graphs of each of the predetermined features in each sentence based on the computed occurrence of the predetermined features; and
- assign a score to the one or more detected predetermined features in each sentence based on the probability value.

34. A method for extracting text in a legal document for preparation of headnotes, the method comprising:
- retrieving feature graphs corresponding to one or more of predetermined features, wherein the feature graphs represent probability of a sentence being a headnote for a specific number of occurrence of the predetermined features in the sentence;
- assigning a score to each predetermined feature in each sentence by referring to the retrieved feature graphs;
- combining each assigned score in each sentence to obtain a final headnote score for each sentence;
- tagging text in the legal document as headnote and non headnote by comparing the final headnote score in each sentence with a predetermined threshold; and
- rendering text in the legal document that are tagged as headnotes on a user interface.

35. A headnote preparation system for extracting text in a legal document for preparation of headnotes, the system comprising:
- a repository for storing feature graphs corresponding to each predetermined feature, wherein the feature graphs represent probability of a sentence being a headnote for a specific number of occurrence of the predetermined features in the sentence;
- a feature score assigning module configured to assign a score to each predetermined feature in each sentence of the legal document by referring to the feature graphs retrieved from the repository;
- a feature integration module configured to combine each assigned score in each sentence to obtain a final headnote score for each sentence;
- a headnote generating module configured to tag text in the legal document as headnote and non headnote by comparing the final headnote score in each sentence with a predetermined threshold; and
- a user interface configured to receive the legal document with text tagged as headnotes.

36. A computer program product comprising:
a non-transitory computer-readable medium having computer-readable program code stored thereon, the computer-readable program code comprising instructions that when executed by a processor, cause the processor to:
- detect one or more predetermined features in each sentence of the legal document, wherein the one or more predetermined features are based on grammatical constituents of text in the legal document;
- compute occurrence of the detected one or more predetermined features in each sentence of the legal document;
- retrieve feature graphs corresponding to the one or more detected predetermined features from a repository, wherein the feature graphs represent likelihood of a sentence being a headnote for a specific number of occurrences of the predetermined features in the sentences;
- analyze the detected one or more predetermined features based on the computed occurrence of the one or more detected predetermined features and the retrieved feature graphs; and
- render the legal document with text tagged as headnote on a user interface based on the analysis.

37. The computer program product of claim 36, wherein the computer-readable program code further comprises instructions that when executed by the processor, cause the processor to:
- assign a score to the one or more predetermined features detected in each sentence by referring to the retrieved feature graphs corresponding to the one or more detected predetermined features;
- combine the assigned score in each sentence to obtain a final headnote score for each sentence;
- compare the final headnote score with a predetermined threshold; and
- tag text in each sentence as headnote and non headnote based on the comparison.

* * * * *